(12) United States Patent
Iwamoto et al.

(10) Patent No.: US 8,813,571 B2
(45) Date of Patent: Aug. 26, 2014

(54) OPTICAL MICROPHONE

(75) Inventors: Takuya Iwamoto, Osaka (JP);
Masahiko Hashimoto, Osaka (JP);
Ushio Sangawa, Nara (JP); Yuriko Kaneko, Nara (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 13/454,154

(22) Filed: Apr. 24, 2012

(65) Prior Publication Data

US 2012/0204649 A1    Aug. 16, 2012

Related U.S. Application Data

(63) Continuation of application No. PCT/JP2011/004500, filed on Aug. 9, 2011.

(30) Foreign Application Priority Data

Aug. 31, 2010   (JP) ................................ 2010-193808

(51) Int. Cl.
*G01N 29/02* (2006.01)
*H04R 23/00* (2006.01)

(52) U.S. Cl.
USPC ................................. 73/643; 73/627; 73/655

(58) Field of Classification Search
USPC ........................................... 73/643, 627, 655
See application file for complete search history.

(56) References Cited

U.S. PATENT DOCUMENTS

| | | | | |
|---|---|---|---|---|
| 5,121,245 A | * | 6/1992 | Johnson | 359/285 |
| 5,541,729 A | * | 7/1996 | Takeuchi et al. | 356/488 |
| 5,781,294 A | * | 7/1998 | Nakata et al. | 356/487 |
| 6,154,551 A | * | 11/2000 | Frenkel | 381/172 |
| 6,650,674 B1 | * | 11/2003 | Hamano et al. | 372/50.1 |
| 8,391,517 B2 | * | 3/2013 | Avenson et al. | 381/172 |

FOREIGN PATENT DOCUMENTS

| | | |
|---|---|---|
| JP | 59-174100 A | 10/1984 |
| JP | 08-265262 A | 10/1996 |
| JP | 2007-194677 A | 2/2007 |
| JP | 2007-295131 A | 11/2007 |
| JP | 2009-085868 A | 4/2009 |

OTHER PUBLICATIONS

International Search Report for corresponding International Application No. PCT/JP2011/004500 mailed Oct. 4, 2011.

* cited by examiner

*Primary Examiner* — J M Saint Surin
(74) *Attorney, Agent, or Firm* — Renner, Otto, Boisselle & Sklar, LLP

(57) ABSTRACT

There is provided an optical microphone for detecting an acoustic wave propagating in an ambient fluid, the optical microphone including: a propagation medium section; a light source for emitting a light wave to be transmitted through a diffraction region in the propagation medium section; and a photoelectric conversion section for detecting the light wave having been transmitted through the propagation medium section. A first acoustic wave which is a portion of the acoustic wave and a second acoustic wave which is another portion thereof are allowed to propagate in the propagation medium section so as to simultaneously arrive at the diffraction region, and an interference component between a $+1^{st}$ order diffracted light wave and a $-1^{st}$ order diffracted light wave of the light wave generated based on a refractive index distribution of the propagation medium occurring in the diffraction region.

16 Claims, 12 Drawing Sheets

OPTICAL MICROPHONE

This is a continuation of International Application No. PCT/JP2011/004500, with an international filing date of Aug. 9, 2011, which claims priority of Japanese Patent Application No. 2010-193808, filed on Aug. 31, 2010, the contents of which are hereby incorporated by reference.

BACKGROUND

1. Technical Field

The present application relates to an optical microphone which receives an acoustic wave propagating through a gas such as air, and converts the received acoustic wave into an electrical signal by use of light.

2. Description of the Related Art

Microphones have conventionally been known as devices for receiving an acoustic wave and converting it into an electrical signal. Many microphones, such as dynamic microphones and condenser microphones, have diaphragms. In these microphones, an acoustic wave is received as it vibrates a diaphragm, this vibration being taken out as an electrical signal. Since this type of microphone has a mechanically vibrating member, the characteristics of the mechanically vibrating member may be altered through repetitive use over a large number of times. Moreover, when the microphone is used for detecting a very intense acoustic wave, the vibrating member may possibly be destroyed.

In order to solve such problems of conventional microphones having a mechanically vibrating member, for example, Japanese Laid-Open. Patent Publication No. 8-265262 (hereinafter "Patent Document 1") and Japanese Laid-Open Patent Publication No. 2009-085868 (hereinafter "Patent Document 2) disclose optical microphones which lack a mechanically vibrating member but detect an acoustic wave by utilizing light waves.

For example, Patent Document 1 discloses a method which modulates light with an acoustic wave, and detects the acoustic wave through detection of the modulated component of light. Specifically, as shown in FIG. 15, laser light which is shaped by using outgoing optics 101 is allowed to act on an acoustic wave 5 which propagates through the air, whereby diffracted light is generated. At this time, two diffracted light components having mutually inverted phases occur. After the diffracted light is adjusted through light-receiving optics 102, only one of the two diffracted light components is received by a photodiode 103 and converted into an electrical signal, whereby the acoustic wave 5 is detected.

Patent Document 2 discloses a method which allows an acoustic wave to propagate through a medium, and detects the acoustic wave through detection of changes in the optical characteristics of the medium. As shown in FIG. 16, an acoustic wave 5 propagating through the air is introduced through an aperture 201, and travels through an acoustic waveguide 202, at least a portion of whose wall surface is made of a photoacoustic propagation medium 203. The acoustic wave traveling through the acoustic waveguide 202 is led into the photoacoustic propagation medium 203, and propagates through the interior thereof. In the photoacoustic propagation medium 203, changes in the refractive index occur with propagation of the acoustic wave. By isolating these changes in the refractive index as an optical modulation by using a laser Doppler vibrometer 204, the acoustic wave 5 is detected. Patent Document 2 discloses that, by using a dry silica gel as the photoacoustic propagation medium 203, it is possible to introduce the acoustic wave in the waveguide into the photoacoustic propagation medium 203 with a high efficiency.

SUMMARY

In the optical microphone of Patent Document 1, it is necessary to detect diffracted light which has occurred from an acoustic wave. However, there is a problem in that, since the angle at which diffracted light occurs depends on the frequency of the acoustic wave, the microphone sensitivity will vary depending on the frequency of the acoustic wave detected.

The method of Patent Document 2 uses a laser Doppler vibrometer. A laser Doppler vibrometer has a large size because it requires a complex optical system composed of an optical frequency shifter such as an acoustooptic element, a large number of mirrors, a beam splitter, lenses, and the like. This has led to the problem of large overall size of the measurement apparatus disclosed in Patent Document 2.

The prior art technique needs further improvement in view of the above-explained problems. One non-limiting, and exemplary embodiment provides an optical microphone whose sensitivity is not dependent on the acoustic wave frequency, with a small and simple construction not employing a laser Doppler vibrometer or the like.

In one general aspect, an optical microphone disclosed herein is an optical microphone for detecting an acoustic wave by using a light wave, the acoustic wave propagating in an ambient fluid, comprising: a propagation medium section for the acoustic wave to propagate through; a light source for emitting a light wave to be transmitted through a diffraction region in the propagation medium section; and a photoelectric conversion section for detecting the light wave having been transmitted through the propagation medium section and outputting an electrical signal, wherein, a first acoustic wave and a second acoustic wave are allowed to propagate in antiparallel directions in the propagation medium section so as to simultaneously arrive at the diffraction region and traverse the light wave being transmitted through the diffraction region, the first acoustic wave being a portion of the acoustic wave and the second acoustic wave being at least a portion of the remainder; in the diffraction region, a $+1^{st}$ order diffracted light wave and a $-1^{st}$ order diffracted light wave of the light wave are generated based on a refractive index distribution of a propagation medium composing the propagation medium section, the refractive index distribution occurring due to propagation of the first acoustic wave and the second acoustic wave; and the photoelectric conversion section detects at least one of: an interference component between a $+1^{st}$ order diffracted light wave of the light wave ascribable to the first acoustic wave and a $-1^{st}$ order diffracted light wave of the light wave ascribable to the second acoustic wave; and another interference component between a $-1^{st}$ order diffracted light wave of the light wave ascribable to the first acoustic wave and a $+1^{st}$ order diffracted light wave of the light wave ascribable to the second acoustic wave.

According to the above aspect, a first acoustic wave, which is a portion of an acoustic wave to be detected, and a second acoustic wave, which is another portion of the acoustic wave, are propagated in antiparallel directions in a propagation medium section, such that the first and second acoustic waves simultaneously traverse a light wave which is transmitted through the propagation medium section. Therefore, a $+1^{st}$ order diffracted light wave ascribable to the first acoustic wave and a $-1^{st}$ order diffracted light wave ascribable to the second acoustic wave, or a $-1^{st}$ order diffracted light wave ascribable to the first acoustic wave and a $+1^{st}$ order diffracted light wave ascribable to the second acoustic wave, are diffracted at the same diffraction angle, irrespective of the acoustic wave frequency. Therefore, there are constant interference components between the $+1^{st}$ order diffracted light waves and the $-1^{st}$ order diffracted light waves irrespective of the acoustic wave frequency, whereby an optical microphone that is capable of acoustic wave detection with a constant detection sensitivity irrespective of the acoustic wave frequency can be realized.

These general and specific aspects may implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 2A shows how first and second acoustic waves may enter a propagation medium section; and FIG. 2B shows how first and second acoustic waves may propagate through the propagation medium section and $\pm 1^{st}$ order diffracted light waves may be generated.

Figure 10:
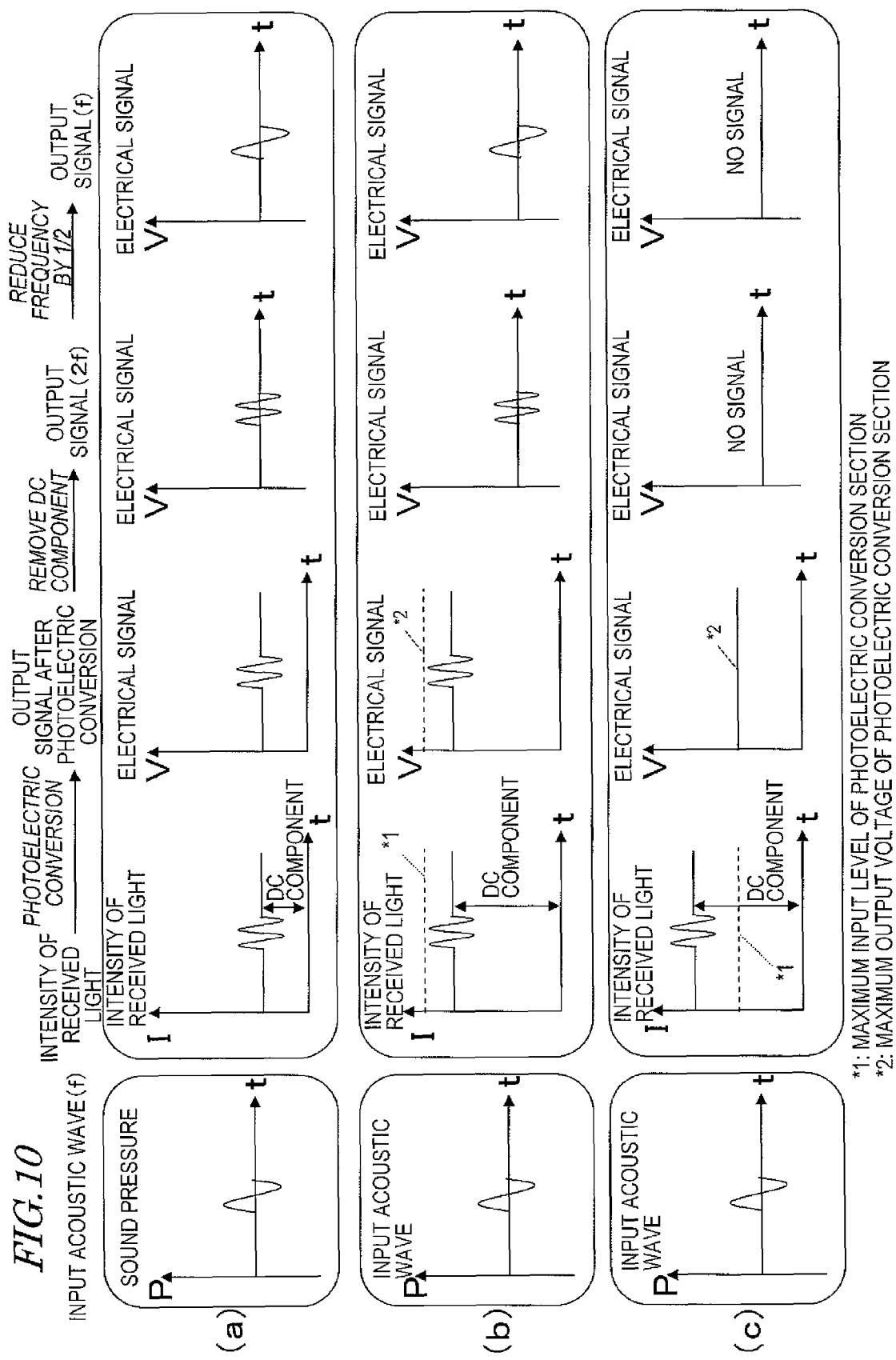

Portions (a), (b), and (c) of FIG. 10 are diagrams for explaining optical signals and electrical signals obtained with the present optical microphone.

Figure 1:
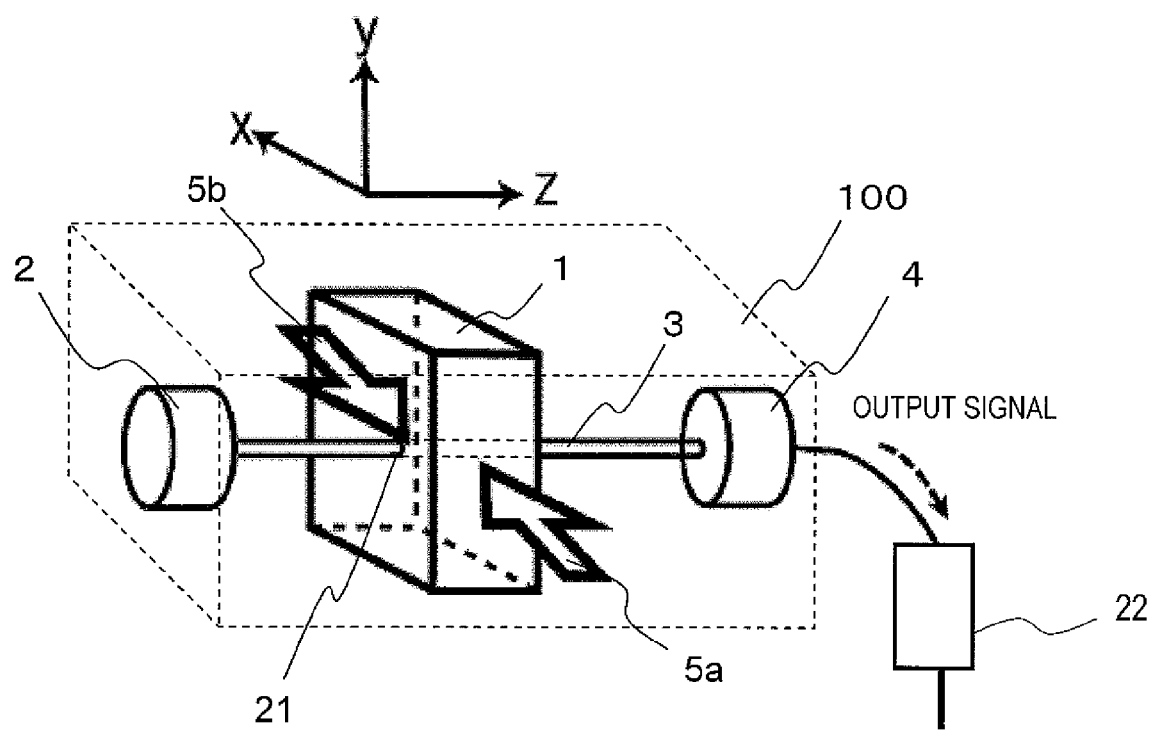
FIG. 1 is a diagram showing the construction of an embodiment of an optical microphone according to the present invention.
Figure 11:
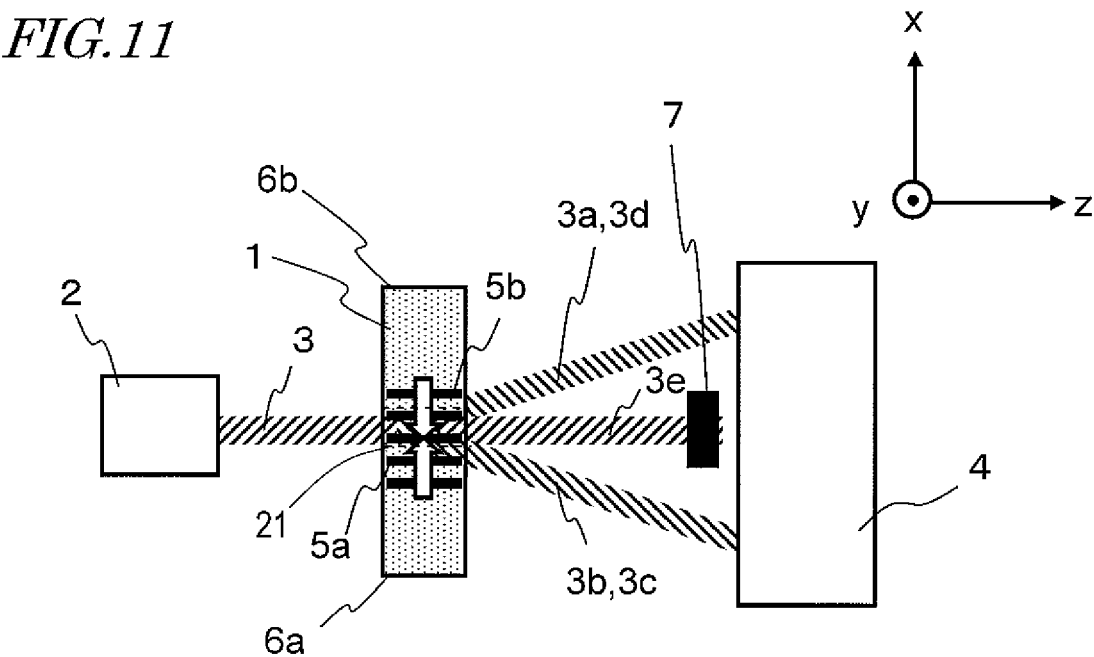

FIG. 11 is a schematic diagram showing a construction for blocking a $0^{th}$ order diffracted light wave in the optical microphone of FIG. 1.

Figure 12:
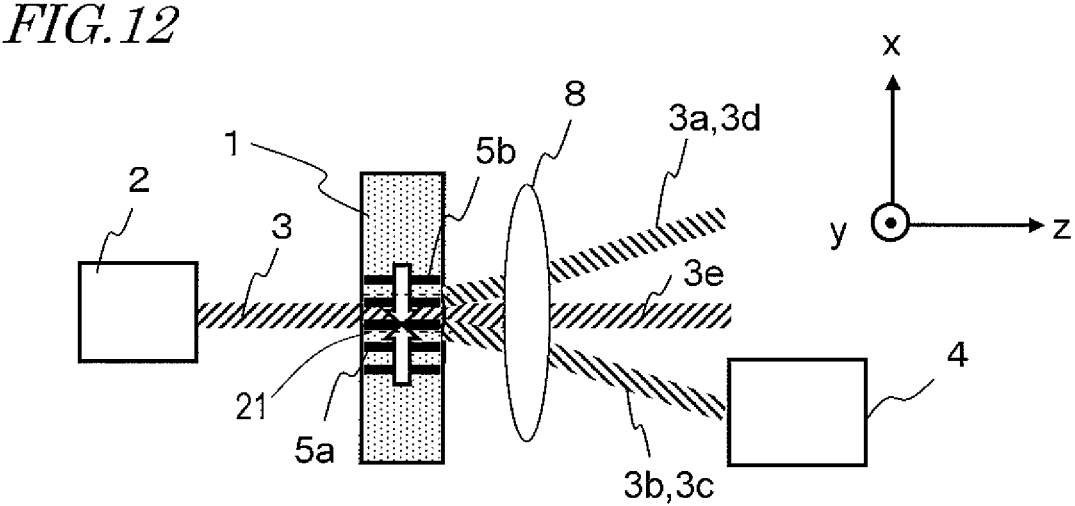

FIG. 12 is a schematic diagram showing a construction obtained by, in the optical microphone of FIG. 1, providing an optical element between the propagation medium section and a photoelectric conversion section.

Figure 13:
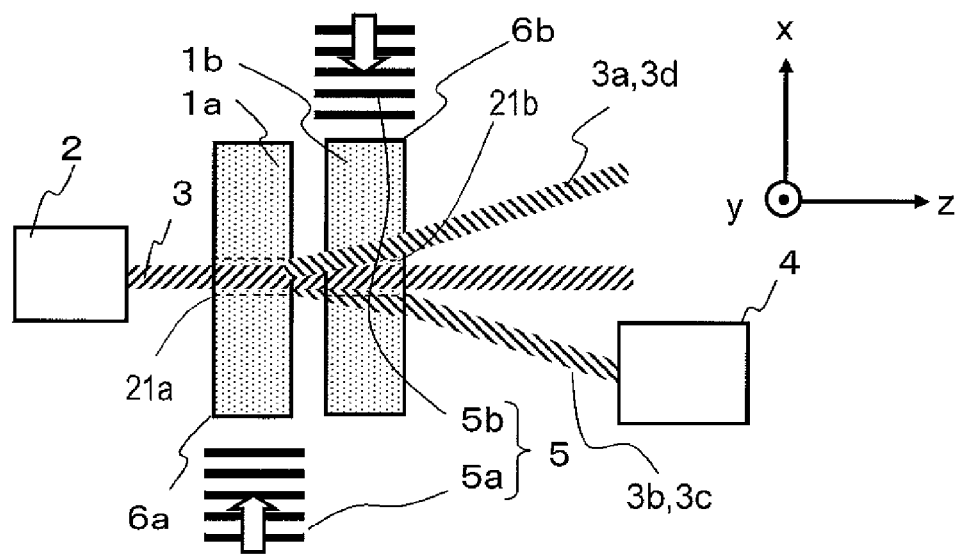

FIG. 13 is a diagram showing an optical microphone including two propagation medium sections.

Figure 14:
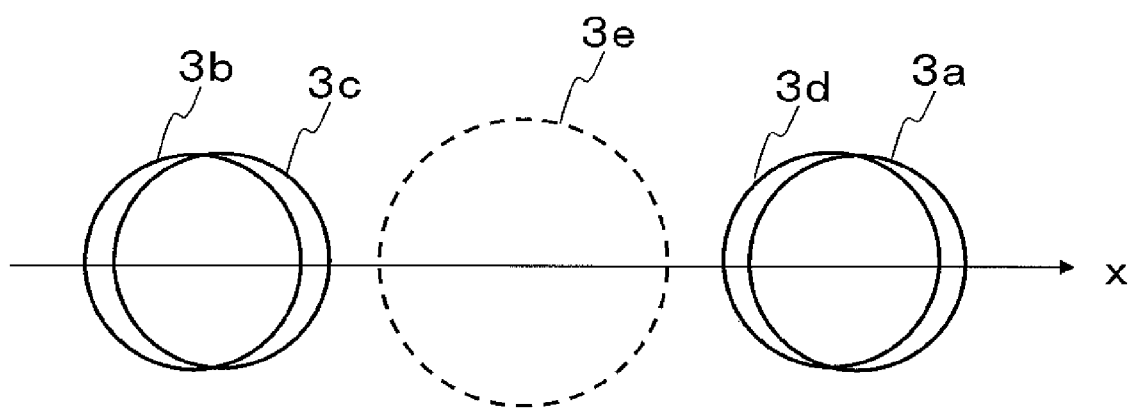

FIG. 14 is a diagram showing the relative positioning of diffracted light waves in the optical microphone of FIG. 13.

Figure 15:
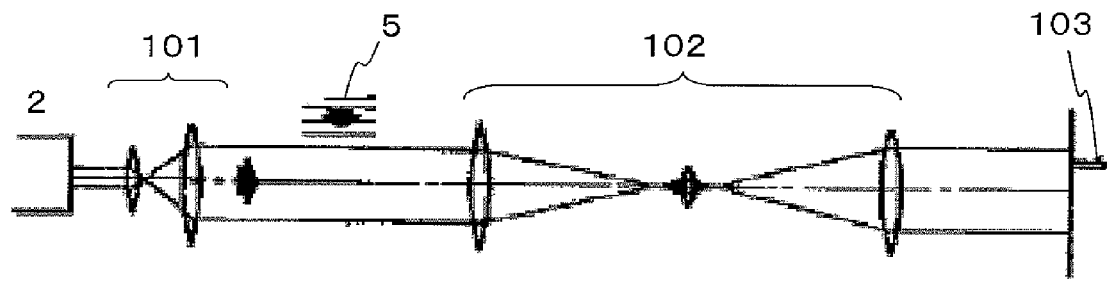

FIG. 15 is a diagram schematically showing the construction of a conventional optical microphone.

Figure 16:
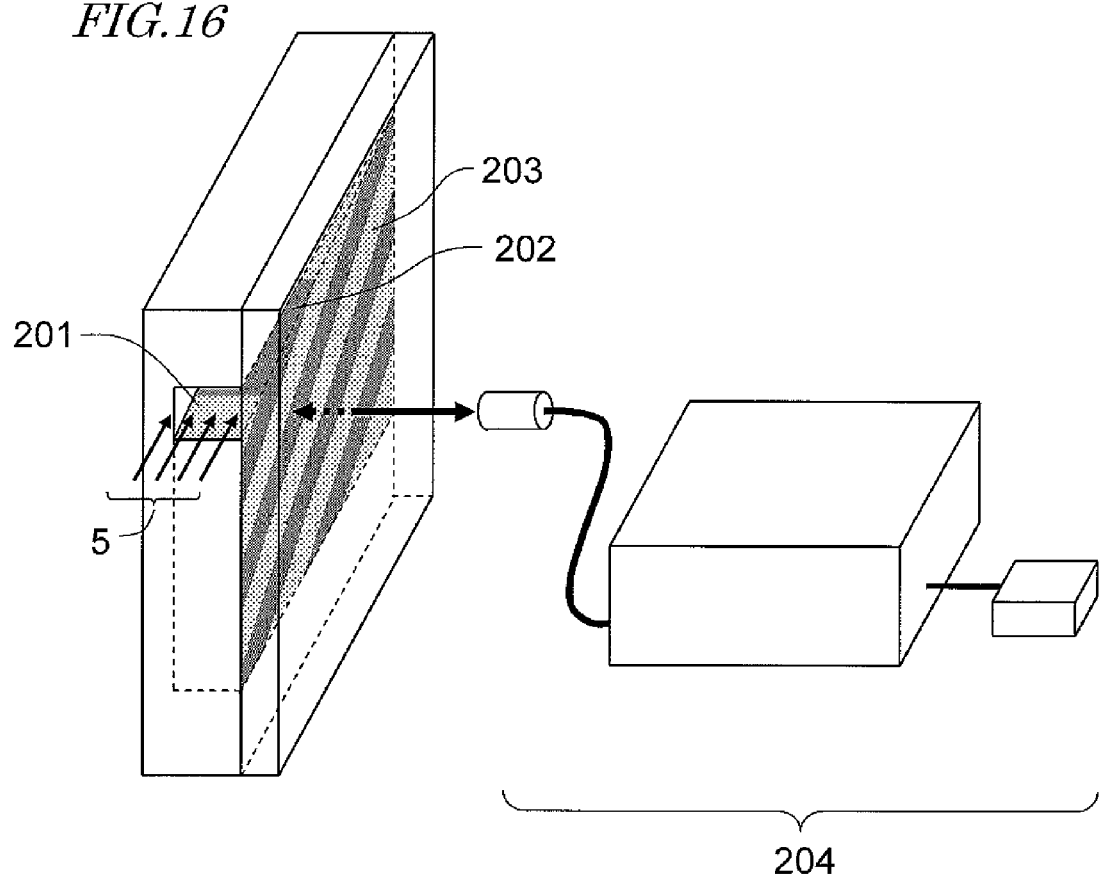

FIG. 16 is a diagram showing the construction of another conventional optical microphone.

DETAILED DESCRIPTION

An optical microphone disclosed in the present application is an optical microphone for detecting an acoustic wave by using a light wave, the acoustic wave propagating in an ambient fluid, comprising: a propagation medium section for the acoustic wave to propagate through; a light source for emitting a light wave to be transmitted through a diffraction region in the propagation medium section; and a photoelectric conversion section for detecting the light wave having been transmitted through the propagation medium section and outputting an electrical signal, wherein, a first acoustic wave and a second acoustic wave are allowed to propagate in antiparallel directions in the propagation medium section so as to simultaneously arrive at the diffraction region and traverse the light wave being transmitted through the diffraction region, the first acoustic wave being a portion of the acoustic wave and the second acoustic wave being at least a portion of the remainder; in the diffraction region, a $+1^{st}$ order diffracted light wave and a $-1^{st}$ order diffracted light wave of the light wave are generated based on a refractive index distribution of a propagation medium composing the propagation medium section, the refractive index distribution occurring due to propagation of the first acoustic wave and the second acoustic wave; and the photoelectric conversion section detects at least one of: an interference component between a $+1^{st}$ order diffracted light wave of the light wave ascribable to the first acoustic wave and a $-1^{st}$ order diffracted light wave of the light wave ascribable to the second acoustic wave; and another interference component between a $-1^{st}$ order diffracted light wave of the light wave ascribable to the first acoustic wave and a $+1^{st}$ order diffracted light wave of the light wave ascribable to the second acoustic wave.

In an exemplary embodiment, the optical microphone further comprises a frequency conversion section for converting a frequency of the electrical signal obtained at the photoelectric conversion section into ½.

In an exemplary embodiment, the photoelectric conversion section is disposed so as to be shifted, along a direction along which the first acoustic wave and the second acoustic wave propagate, from the light wave having been transmitted through the diffraction region, and detects only one of: the interference component between the $+1^{st}$ order diffracted light wave of the light wave ascribable to the first acoustic wave and the $-1^{st}$ order diffracted light wave of the light wave ascribable to the second acoustic wave; and the other interference component between the $-1^{st}$ order diffracted light wave of the light wave ascribable to the first acoustic wave and the $+1^{st}$ order diffracted light wave of the light wave ascribable to the second acoustic wave.

In an exemplary embodiment, the optical microphone further comprises, between the photoelectric conversion section and the diffraction region in the propagation medium section, a blocking section for blocking the light wave having been transmitted through the diffraction region so that a part or a whole of the light wave having been transmitted through the diffraction region is prevented from entering the photoelectric conversion section.

In an exemplary embodiment, the first acoustic wave and the second acoustic wave are transmitted through a same terrain in the diffraction region.

In an exemplary embodiment, the first acoustic wave and the second acoustic wave are transmitted through different terrains in the diffraction region.

In an exemplary embodiment, the propagation medium section includes a first propagation medium portion and a second propagation medium portion; the diffraction region includes a first diffraction subregion and a second diffraction subregion respectively positioned in the first propagation medium portion and the second propagation medium portion; and between the light source and the photoelectric conversion section, the first diffraction subregion and the second diffraction subregion are together disposed so that one is overlaid on the other.

In an exemplary embodiment, the propagation medium section has an acoustic velocity smaller than that of air, and is composed of a propagation medium in solid form.

In an exemplary embodiment, the propagation medium is composed of a dry silica gel.

In an exemplary embodiment, the optical microphone further comprises, between the propagation medium and the photoelectric conversion section, an optical element for changing directions of propagation of the +1$^{st}$ order diffracted light wave and the −1$^{st}$ order diffracted light wave of the light wave.

In an exemplary embodiment, the propagation medium section includes first and second input aperture planes opposite from each other, the first acoustic wave and the second acoustic wave being respectively incident to the first and second input aperture planes.

In an exemplary embodiment, the first and second input aperture planes of the propagation medium section are positioned equidistant from the diffraction region.

In an exemplary embodiment, the optical microphone further comprises a waveguide structure having: first and second input apertures facing in a same direction; first and second output apertures opposing each other; and first and second waveguides provided respectively between the first and second input apertures and the first and second output apertures, the waveguide structure guiding the first acoustic wave entering at the first input aperture and the second acoustic wave entering at the second input aperture respectively to the first and second output apertures, wherein the first and second output apertures of the waveguide structure are disposed on the first and second input aperture planes of the propagation medium section, respectively.

In an exemplary embodiment, the first and second waveguides are disposed symmetrically in the waveguide structure.

In an exemplary embodiment, the optical microphone further comprises a horn connected to the first and second input apertures of the waveguide structure.

A method of detecting an acoustic wave according to the present invention is a method of detecting an acoustic wave propagating in an ambient fluid by using a light wave, the method comprising: a step of allowing a first acoustic wave and a second acoustic wave to propagate in antiparallel directions in the propagation medium section so as to simultaneously arrive at a diffraction region of the propagation medium section, the first acoustic wave being a portion of the acoustic wave and the second acoustic wave being at least a portion of the remainder; a step of allowing a light wave to be transmitted through the diffraction region of the propagation medium section so as to traverse the propagating first acoustic wave and second acoustic wave, and generating a +1$^{st}$ order diffracted light wave and a −1$^{st}$ order diffracted light wave of the light wave in the diffraction region based on a refractive index distribution of a propagation medium composing the propagation medium section, the refractive index distribution occurring due to propagation of the first acoustic wave and the second acoustic wave; and a step of detecting at least one of: an interference component between a +1$^{st}$ order diffracted light wave of the light wave ascribable to the first acoustic wave and a −1$^{st}$ order diffracted light wave of the light wave ascribable to the second acoustic wave; and another interference component between a −1$^{st}$ order diffracted light wave of the light wave ascribable to the first acoustic wave and a +1$^{st}$ order diffracted light wave of the light wave ascribable to the second acoustic wave.

Hereinafter, with reference to the drawings, embodiments of an optical microphone according to the present invention will be described.

FIG. 1 shows the construction of a main portion of an optical microphone 100 according to the present embodiment. The optical microphone 100 is a microphone for detecting an acoustic wave 5 propagating through an ambient fluid, such that the acoustic wave 5 is detected as an electrical signal by using a light wave. As used herein, an "ambient fluid" means a fluid which exists in the external space of the optical microphone 100. For example, the ambient fluid may be air.

The optical microphone 100 includes a propagation medium section 1, a light source 2, and a photoelectric conversion section 4. In the optical microphone 100, the acoustic wave 5 is propagated through the propagation medium section 1; in the propagation medium section 1, the acoustic wave 5 is allowed to interact with a light wave 3 which is output from a light source 2, so that information carried by the acoustic wave 5 is superposed onto the light wave having been transmitted through the propagation medium section 1; and the photoelectric conversion section 4 converts the light wave 3 into an electrical signal, whereby the acoustic wave 5 is detected as the electrical signal. One feature of the optical microphone 100 is as follows: the acoustic wave 5 is split into a first acoustic wave 5a (being a portion of the acoustic wave 5) and a second acoustic wave 5b (being at least a portion of the remainder); and the first acoustic wave 5a and second acoustic wave 5b are propagated within the propagation medium section 1 in antiparallel directions, so as to interact with the light wave 3.

Hereinafter, the constituent elements of the optical microphone 100 will be specifically described. For ease of understanding, coordinates are defined as shown in FIG. 1. Specifically, a direction along which the acoustic wave 5 propagates is taken on the x axis, and a direction along which the light wave 3 propagates is taken on the z axis. A direction which is perpendicular to the x axis and the z axis is taken on the y axis.

(Propagation Medium Section 1)

Figure 2A:
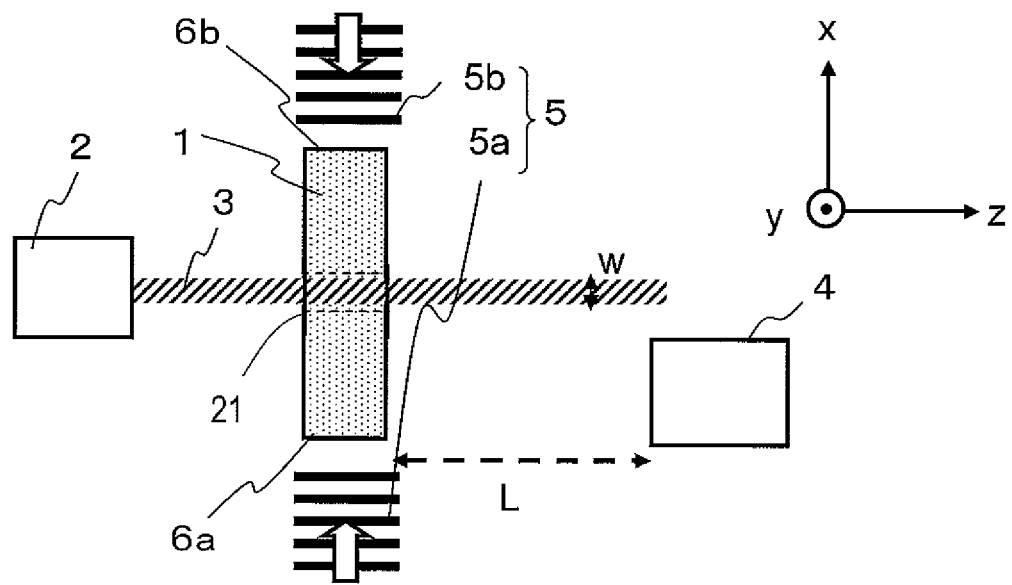
FIGS. 2A and 2B are cross-sectional views of the optical microphone shown in FIG. 1, where

FIG. 2A is a cross-sectional view of the optical microphone 100 in a plane on which the light wave 3 propagates, i.e., the x-z plane in FIG. 1, schematically showing how the acoustic wave 5 may enter into the propagation medium section 1 from the ambient fluid.

The propagation medium section 1 has a first input aperture plane 6a and a second input aperture plane 6b which are struck by the first acoustic wave 5a and second acoustic wave 5b, respectively. The first input aperture plane 6a and the second input aperture plane 6b are defined by opposite planes. Moreover, the first input aperture plane 6a and the second input aperture plane 6b are parallel to each other.

As will be described in detail below, the light wave 3 emitted from the light source 2 is transmitted through a diffraction region 21 which is provided in the propagation medium section 1. The first and second acoustic waves 5a and 5b entering at the first and second input aperture planes 6a and 6b propagate in antiparallel directions in the diffraction region 21. The first and second acoustic waves 5a and 5b may arrive at the diffraction region 21 at the same point in time. Also, the first and second acoustic waves 5a and 5b may propagate so as to traverse the light wave 3.

The propagation medium section 1 may be composed of a solid-form propagation medium, and has an acoustic velocity which is smaller than that of air. Specifically, the acoustic velocity of the propagation medium section 1 may be smaller than 340 m/sec, which is the acoustic velocity of air. By using a material in solid form as the propagation medium, a large diffraction effect can be obtained in the propagation medium section 1. Moreover, it is generally the case that material having a small acoustic velocity also has a relatively small density, so that reflection at the boundary between the ambient fluid such as air and the propagation medium section 1 is reduced, whereby an acoustic wave can be introduced into the propagation medium section 1 with a relatively high efficiency.

It is particularly preferable to use a dry silica gel as the propagation medium of the propagation medium section 1. Dry silica gel is characterized in that it has a small difference in acoustic impedance with respect to air. Therefore, the first and second acoustic waves 5a and 5b propagating in the air can be efficiently introduced into the interior of the propagation medium section 1 being composed of a dry silica gel. Specifically, a dry silica gel has an acoustic velocity of 50 to 150 m/sec, which is smaller than the acoustic velocity in air, i.e., 340 m/sec, and also has a density as small as about 70 to 280 kg/m$^3$. Since there is little difference from the acoustic impedance of air and thus little reflection at the interface, an acoustic wave in the air will be efficiently introduced into the interior of the dry silica gel. For example, when a dry silica gel having an acoustic velocity of 50 m/sec and a density of 100 kg/m$^3$ is used, there will be 70% reflection occurring at its interface with the air, so that about 30% of the energy of the acoustic wave will be introduced into the interior without being reflected at the interface. Moreover, a dry silica gel also has an advantage of exhibiting a large amount of refractive index change $\Delta n$ for light waves. The amount of refractive index change $\Delta n$ of air is $2.0 \times 10^{-9}$ against a 1 Pa change in sound pressure, whereas the amount of refractive index change $\Delta n$ of a dry silica gel against a 1 Pa change in sound pressure is as large as about $1.0 \times 10^{-7}$. Therefore, even without providing a large propagation medium over 10 cm, a sufficient sensitivity can be obtained.

(Acoustic Wave 5)

As described above, the acoustic wave 5 is allowed to enter the propagation medium section 1 in the form of the first acoustic wave 5a and second acoustic wave 5b. As shown in FIG. 2A, the first acoustic wave 5a and the second acoustic wave 5b may propagate through the propagation medium section 1 in antiparallel directions. For this purpose, the propagation medium section 1 has the first input aperture plane 6a and the second input aperture plane 6b, such that the first acoustic wave 5a and second acoustic wave 5b respectively enter the propagation medium section 1 at the first input aperture plane 6a and the second input aperture plane 6b.

Moreover, the first acoustic wave 5a and second acoustic wave 5b may be acoustic waves of an equal frequency. Their having an "equal frequency" means that, when the first acoustic wave 5a and second acoustic wave 5b are each a continuous wave or burst wave of a certain frequency, their frequencies are equal. In the case where the first acoustic wave 5a and second acoustic wave 5b each change in frequency over time, it is further meant that the first acoustic wave 5a and second acoustic wave 5b have an equal frequency at any given point in time. However, the amplitudes of the first acoustic wave 5a and second acoustic wave 5b do not need to be equal, but may be different.

When an acoustic wave 5 propagating through an ambient fluid is split into a first acoustic wave 5a and a second acoustic wave 5b, unless they are subjected to some special process, the first acoustic wave 5a and second acoustic wave 5b will generally have an equal frequency. Moreover, the first acoustic wave 5a and second acoustic wave 5b will also be in phase. However, the first acoustic wave 5a and second acoustic wave 5b do not need to be in phase, but may have opposite phases to each other.

Figure 3:
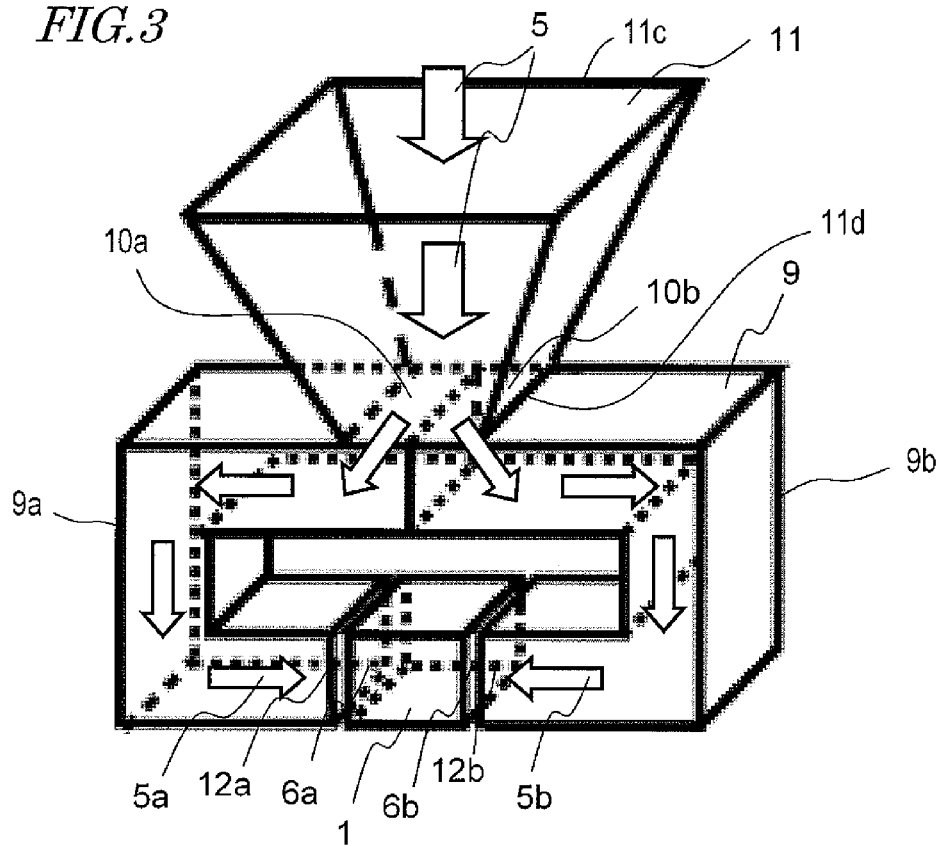
FIG. 3 is a schematic perspective view showing a waveguide structure which can be used for the optical microphone.

In order to generate the first acoustic wave 5a and second acoustic wave 5b from the acoustic wave 5 and input them to the propagation medium section 1, the optical microphone 100 may have a waveguide structure 9 and a horn 11 as shown in FIG. 3, for example.

The horn 11 has an input aperture 11c, through which the acoustic wave 5 enters, and an output aperture 11d, through which the acoustic wave 5 goes out. The input aperture 11c is larger than the output aperture 11d, and side faces connecting the input aperture 11c and the output aperture 11d constitute a horn shape. This increases the sound pressure of the acoustic wave 5 entering through the input aperture 11c, such that the acoustic wave 5 with the increased sound pressure goes out through the output aperture 11d.

The waveguide structure 9 has first and second input apertures 10a and 10b and first and second output apertures 12a and 12b. The waveguide structure 9 includes first and second waveguides 9a and 9b which are provided between the first input aperture 10a and the first output aperture 12a and between the second input aperture 10b and the second output aperture 12b, respectively. The first and second waveguides 9a and 9b are provided in a symmetric manner in the waveguide structure 9. The first and second input apertures 10a and 10b of the waveguide structure 9 face in the same direction, and are connected to the output aperture 11d of the horn 11. The first and second output apertures 12a and 12b are parallel to and facing each other. The first and second output apertures 12a and 12b respectively couple to the first input aperture plane 6a and the second input aperture plane 6b of the propagation medium section 1.

The acoustic wave 5 entering the waveguide structure 9 through the output aperture 11d of the horn 11 is split into two at the first and second input apertures 10a and 10b. The resulting first acoustic wave 5a and second acoustic wave 5b propagate respectively through the first waveguide 9a and the second waveguide 9b, so as to enter the propagation medium section 1 through the first and second output apertures 12a and 12b in antiparallel directions.

In this manner, the acoustic wave 5 propagating through an ambient fluid is allowed to split into the first acoustic wave 5a and second acoustic wave 5b, which are then input to the propagation medium section 1 in opposite directions. Moreover, the horn 11 disposed before the waveguide structure 9 allows the acoustic wave 5 to be taken in more efficiently, thus increasing the sensitivity of the microphone.

Figure 4:
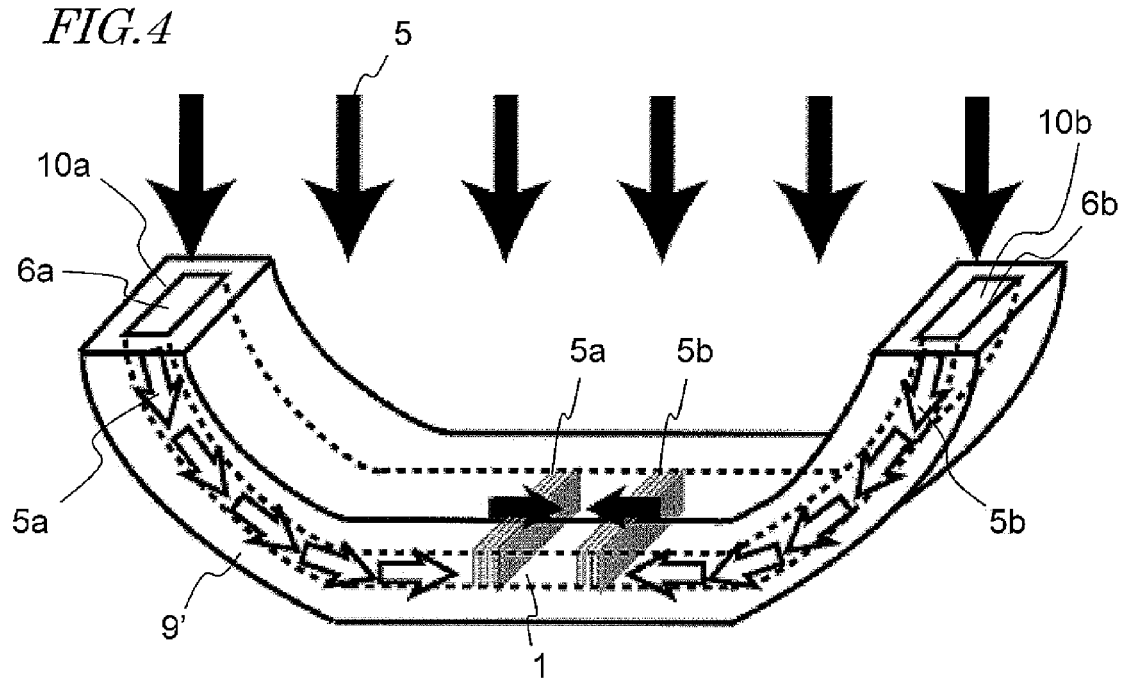
FIG. 4 is a schematic perspective view showing an exemplary waveguide structure in which a propagation medium section is incorporated.

Alternatively, the propagation medium section 1 may be disposed inside the waveguide structure. A waveguide structure 9' shown in FIG. 4 includes a cavity having first and second input apertures 10a and 10b at its both ends. The cavity is gently bent from each of the first and second input apertures 10a and 10b, so as to merge into one linear portion. The propagation medium section 1 is provided within the cavity. The first input aperture plane 6a and the second input aperture plane 6b of the propagation medium section 1 may coincide with the first input aperture 10a and the second input aperture 10b of the waveguide structure 9', or positioned within the cavity of the waveguide structure 9'. The propagation medium section 1 is disposed in the linear portion of the cavity. An acoustic wave 5 propagating through an ambient fluid enters the cavity at the first and second input aperture planes 6a and 6b, and propagates along the waveguide structure 9' as a first acoustic wave 5a and a second acoustic wave 5b, which propagate in mutually opposite directions within the linear portion. Thus, the waveguide structure 9' allows the first acoustic wave 5a and second acoustic wave 5b to be generated from the acoustic wave 5, such that the first acoustic wave 5a and second acoustic wave 5b propagate in antiparallel directions within the propagation medium section 1.

Figure 5:
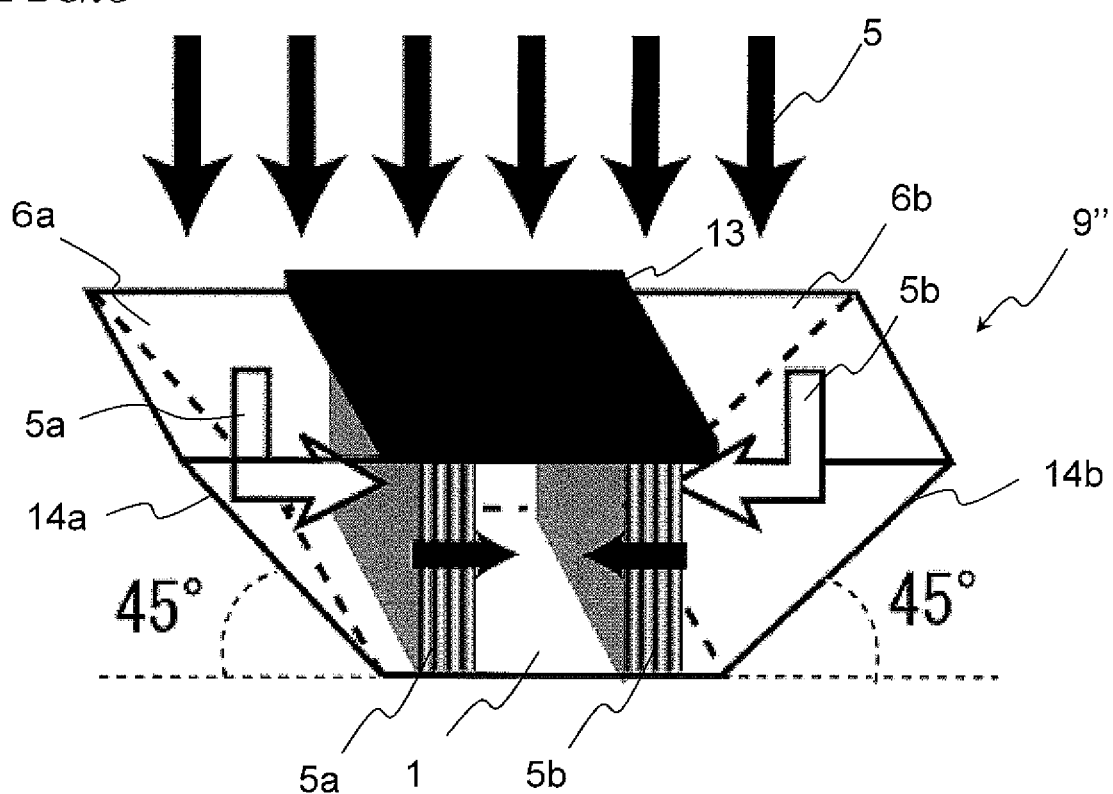
FIG. 5 is a schematic perspective view showing another exemplary waveguide structure in which a propagation medium section is incorporated.

In another manner of disposing the propagation medium section 1 inside the waveguide structure, the optical microphone 100 may have a waveguide structure 9'' as shown in FIG. 5. The entire waveguide structure 9'' is composed of the propagation medium section 1. The waveguide structure 9'' has first and second input aperture planes 6a and 6b and first and second reflection surfaces 14a and 14b. The first and second input aperture planes 6a and 6b may be two independent apertures, or may be apertures emerging at both ends of a buffer plate 13 which is placed in the central portion of one face of a three-dimensional figure defined by the propagation medium section 1. The first and second input aperture planes 6a and 6b are each disposed perpendicular to the direction in which an acoustic wave 5 propagates, while facing in the same direction. The first and second reflection surfaces 14a and 14b may be respectively disposed at an angle of 45° with respect to the first and second input aperture planes 6a and 6b.

An acoustic wave 5 which is input in a direction perpendicular to the first and second input aperture planes 6a and 6b propagates in the propagation medium section 1 as a first acoustic wave 5a and a second acoustic wave 5b, respectively, so as to be reflected by the first and second reflection surfaces 14a and 14b. As a result of this, the first acoustic wave 5a reflected by the first reflection surface 14a and the second acoustic wave 5b reflected by the second reflection surface 14b propagate in antiparallel directions within the propagation medium section 1.

By using the buffer plate 13 to prevent the acoustic wave 5 from being directly input at the neighborhood where the first acoustic wave 5a and second acoustic wave 5b meet, it is possible to avoid straying of any acoustic wave that may hinder detection of the first acoustic wave 5a and second acoustic wave 5b, thereby allowing the acoustic wave 5 to be accurately detected.

Note that the first acoustic wave 5a and second acoustic wave 5b do not need to be two split portions of an acoustic wave 5 that propagates through an ambient fluid. Two acoustic waves 5 which are output from two different sound sources outputting the same waveform may be utilized as the first acoustic wave 5a and second acoustic wave 5b.

(Light Source 2)

As shown in FIG. 2A, the light source 2 outputs the light wave 3 toward the propagation medium section 1. There are no particular limitations as to the wavelength and intensity of the light wave 3, and any wavelength and intensity that allows the photoelectric conversion section 4 to detect the light wave 3 with a good sensitivity may be selected. However, it is preferable to select a wavelength which is not so readily absorbed by the propagation medium section 1.

Figure 2B:
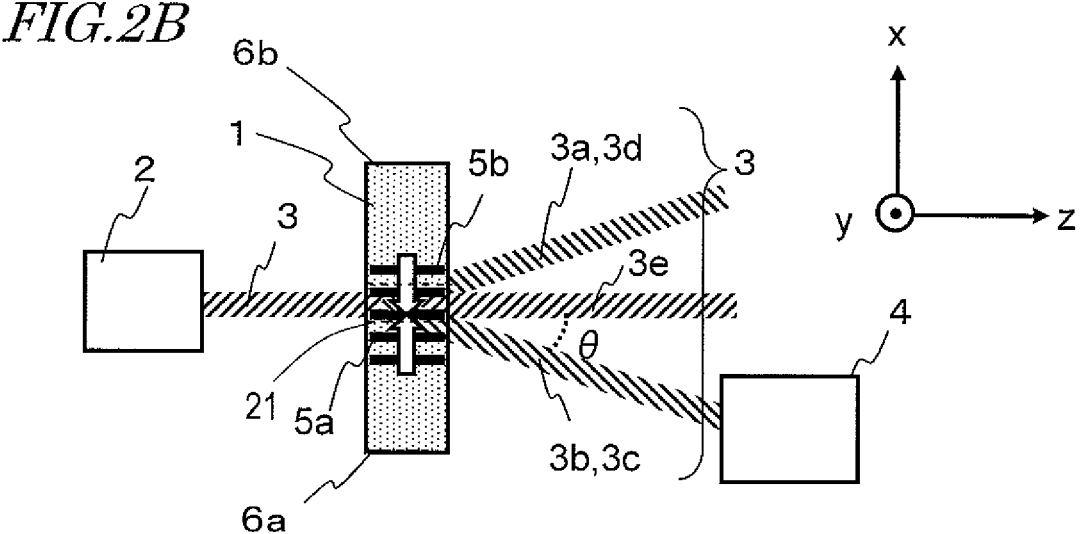

The light wave 3 emitted from the light source 2 enters the diffraction region 21 of the propagation medium section 1, and as shown in FIG. 2B, interacts with the first acoustic wave 5a and second acoustic wave 5b within the propagation medium section 1. Specifically, with propagation of the first acoustic wave 5a and second acoustic wave 5b, a density distribution of the propagation medium occurs in the diffraction region 21 of the propagation medium section 1, which induces a refractive index distribution in the propagation medium. The refractive index distribution of the propagation medium functions as a diffraction grating for the light wave 3, whereby the light wave 3 is diffracted. This causes a $+1^{st}$ order diffracted light wave 3a and a $-1^{st}$ order diffracted light wave 3b of the light wave 3 (which are ascribable to the first acoustic wave 5a) and a $+1^{st}$ order diffracted light wave 3c and a $-1^{st}$ order diffracted light wave 3d of the light wave 3 (which are ascribable to the second acoustic wave 5b). As will be described below, the refractive index distribution moves as the first acoustic wave 5a and second acoustic wave 5b are propagated; therefore, the diffracted light waves undergo a frequency shift due to a Doppler effect.

As the light wave 3, either coherent light or incoherent light may be used. However, use of coherent light, e.g., laser light, will facilitate interference of the diffracted light waves and isolation of the signal.

In order to obtain diffracted light waves of the light wave 3, it is preferable that the direction of propagation of the light wave 3 and the direction of propagation of the first acoustic wave 5a and second acoustic wave 5b are non-parallel, i.e., the first acoustic wave 5a and second acoustic wave 5b propagate so as to traverse the light wave 3. In particular, the highest diffraction efficiency will be obtained when the directions of propagation of the first acoustic wave 5a and second acoustic wave 5b are perpendicular to the direction of propagation of the light wave 3 on the x-z plane, thus realizing a high microphone sensitivity.

The position at which the light wave 3 is transmitted in the propagation medium section 1, i.e., the position of the diffraction region 21, may be determined so that the first acoustic wave 5a and second acoustic wave 5b arrive at the diffraction region 21 at the same point in time.

In the case where the acoustic wave 5 is a continuous wave consisting of a sine wave having a single frequency or the like, an acoustic wave of the same frequency always continues. Therefore, it can be said that the same acoustic wave, i.e., the first acoustic wave 5a and second acoustic wave 5b, will arrive at the diffraction region 21 at the same point in time regardless of where in the propagation medium section 1 the diffraction region 21 is located.

However, in the case where the acoustic wave 5 is not a continuous wave, but a wave which is discontinuous over time, e.g., a single-pulse burst signal as shown in FIG. 6, or an acoustic wave whose frequency changes over time, the diffraction region 21 is preferably set at a position where the first acoustic wave 5a and second acoustic wave 5b pass or overlap each other within the propagation medium section 1, thus ensuring that the first acoustic wave 5a and second acoustic wave 5b will concurrently act on the light wave 3.

In the case where the propagation medium section 1 is composed of a uniform propagation medium, such that the first acoustic wave 5a and second acoustic wave 5b enter the first and second input aperture planes 6a and 6b at the same point in time, the diffraction region 21 is positioned equidistant from the first and second input aperture planes 6a and 6b.

Figure 6A:
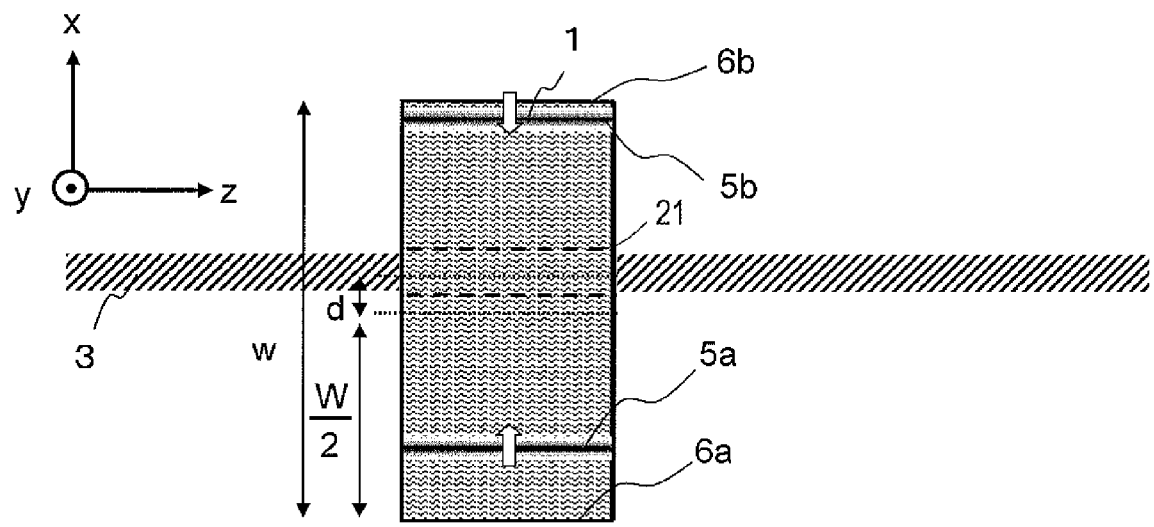
FIGS. 6A and 6B are diagrams for explaining adjustment of the position of a diffraction region.
Figure 6B:
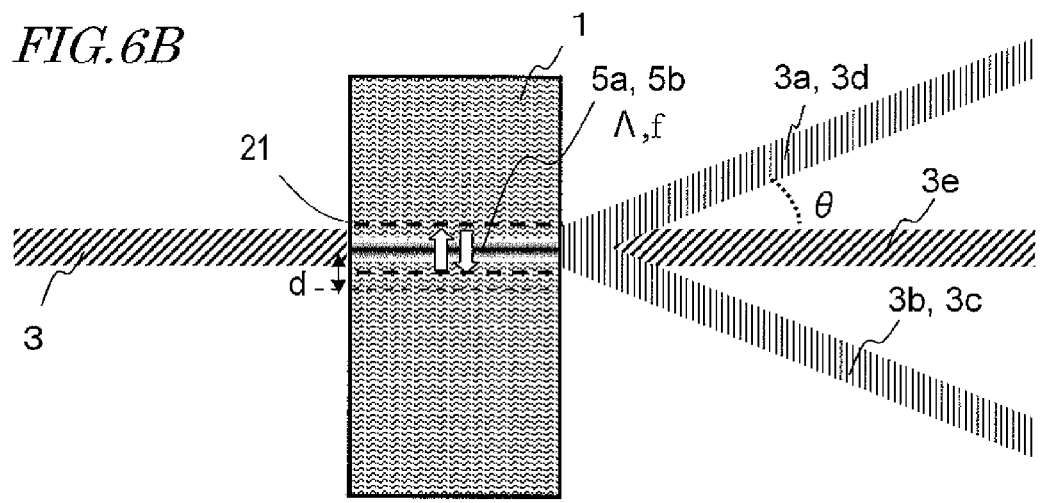

In the case where the first acoustic wave 5a and second acoustic wave 5b enter the propagation medium section at different points in time through the first input aperture plane 6a and the second input aperture plane 6b of the propagation medium section 1, the position of the diffraction region 21 can be determined by the following method, for example. Consider an example case where, as illustrated in FIG. 6A, the acoustic wave 5a enters first at the first input aperture plane 6a, then followed Δt seconds later by the acoustic wave 5b entering at the second input aperture plane 6b. FIGS. 6A and 6B show propagation of single-pulse first and second acoustic waves 5a and 5b as a chronological change. The time difference Δt information may be calculated from the distances from the sound source to the input aperture planes 6a and 6b and also from the velocity of the acoustic wave 5 within the ambient fluid, or acquired by measuring the points in time at which the first and second acoustic waves 5a and 5b arrive, with microphones for adjustment purposes being provided before the input aperture planes 6a and 6b. In FIGS. 6A and 6B, the distance between the first input aperture plane 6a and the second input aperture plane 6b is designated W. When Δt is 0, i.e., acoustic waves 5a and 5b enter the propagation medium section 1 at the same time, the diffraction region 21 may be provided at an equidistant position from the first and second input aperture planes 6a and 6b, as mentioned above. In other words, the diffraction region 21 may be provided at a position which is W/2 away from the first and second input aperture planes 6a and 6b. When Δt is not 0, the diffraction region 21 needs to be located at a position which is shifted from the central position of the propagation medium section 1, toward whichever one of the input aperture planes 6a and 6b that is reached by the acoustic wave 5 later. The distance d of shift is Vn×Δt/2, where Vn is the acoustic velocity of the first and second acoustic waves 5a and 5b in the propagation medium section 1. Thus, no matter what signals the first and second acoustic waves 5a and 5b may be, the first acoustic wave 5a and second acoustic wave 5b are allowed to concurrently interact with the light wave 3 in the propagation medium section 1.

(Photoelectric Conversion Section 4)

As shown in FIGS. 2A and 2B, the photoelectric conversion section 4 is located opposite from the light source 2 with the propagation medium section 1 interposed therebetween, so that the light source 2 and the photoelectric conversion section 4 oppose each other. The photoelectric conversion section 4 detects the light wave 3, which is emitted from the light source 2 and transmitted through the diffraction region 21 of the propagation medium section 1. Specifically, the photoelectric conversion section 4 receives at least either one of the following two sets of diffracted light waves: the $+1^{st}$ order diffracted light wave 3a of the light wave 3 (ascribable to the first acoustic wave 5a) and the $-1^{st}$ order diffracted light wave 3d of the light wave 3 (ascribable to the second acoustic wave 5b); or the $-1^{st}$ order diffracted light wave 3b of the light wave 3 (ascribable to the first acoustic wave 5a) and the $+1^{st}$ order diffracted light wave 3c of the light wave 3 (ascribable to the second acoustic wave 5b), and converts them into an electrical signal. The light wave 3 received by the photoelectric conversion section 4 preferably does not contain the $0^{th}$ order diffracted light wave 3e, because the $0^{th}$ order diffracted light wave 3e does not contribute to detection of the acoustic wave. However, so long as at least either the $+1^{st}$ order diffracted light wave 3a and $-1^{st}$ order diffracted light wave 3d or the $-1^{st}$ order diffracted light wave 3b and $+1^{st}$ order diffracted light wave 3c are contained, the acoustic wave 5 is detectable even if the $0^{th}$ order diffracted light wave 3e is contained, because the information of the acoustic wave 5 is still contained.

In order to prevent the $0^{th}$ order diffracted light wave 3e from being received by the photoelectric conversion section 4, the photoelectric conversion section 4 may be shifted along the x axis direction so that the $0^{th}$ order diffracted light wave 3e will not enter the photoelectric conversion section 4, or a buffer plate may be provided between the photoelectric conversion section 4 and the propagation medium section 1 so as to block a part or a whole of the $0^{th}$ order diffracted light wave 3e.

As will be described in detail below, the photoelectric conversion section 4 outputs an electrical signal that contains a component having a frequency which is twice that of the acoustic wave 5. Therefore, as shown in FIG. 1, by connecting the photoelectric conversion section 4 to a frequency converter 22 and allowing the frequency of the input signal to be converted to a half in the frequency converter 22, an electrical signal having the component of the acoustic wave 5 is obtained.

(Operation of the Optical Microphone 100)

Next, the operation of the optical microphone 100 will be described.

In the optical microphone 100 having its constituent elements disposed in the manner described above, when the first acoustic wave 5a and second acoustic wave 5b propagate in antiparallel directions in the diffraction region 21 of the propagation medium section 1, the light wave 3 is affected by the action of the propagation of the first acoustic wave 5a and second acoustic wave 5b.

As shown in FIG. 2A, the first acoustic wave 5a and second acoustic wave 5b entering at the first and second input aperture planes 6a and 6b of the propagation medium section 1 propagate through the propagation medium section 1, and arrive at the diffraction region 21 at the same point in time as shown in FIG. 2B. In the diffraction region 21, the manner in which the light wave 3 and the first acoustic wave 5a and second acoustic wave 5b interact will be described separately with respect to each acoustic wave.

Figure 7A:
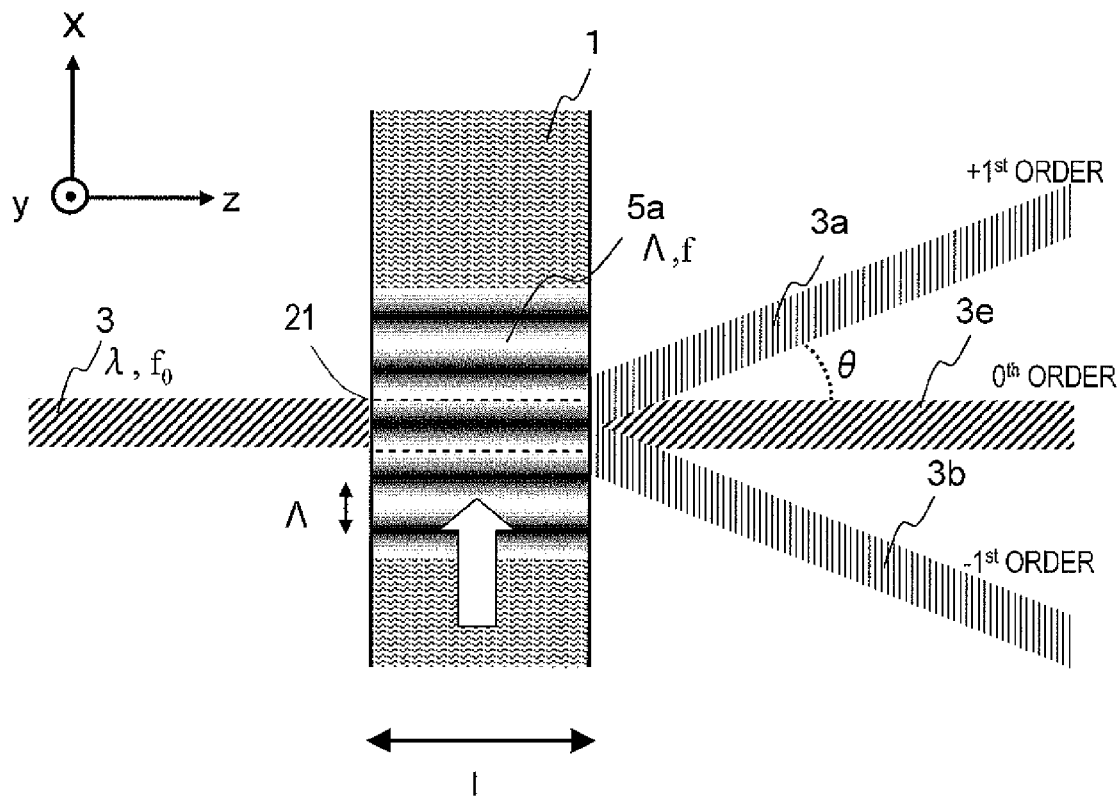
FIG. 7A is a diagram showing light wave diffraction caused by a first acoustic wave in a diffraction region of the propagation medium section.
Figure 7B:
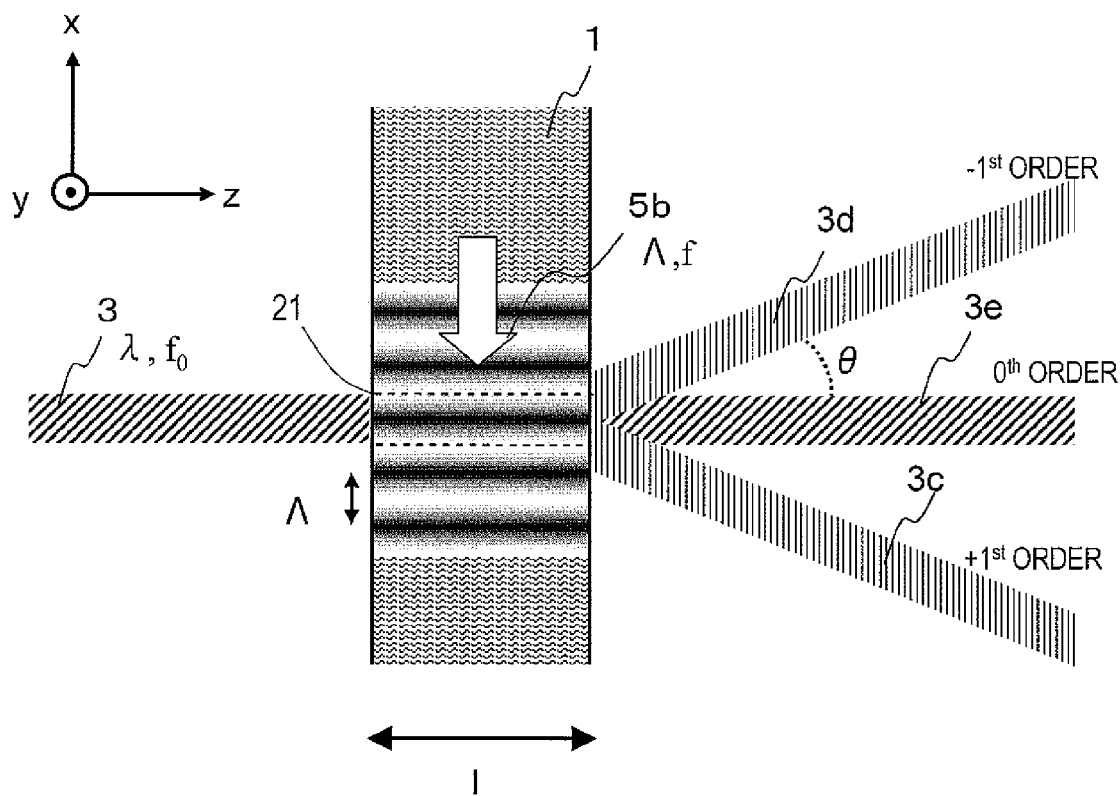
FIG. 7B is a diagram showing light wave diffraction caused by a second acoustic wave in a diffraction region of the propagation medium section.

FIG. 7A shows how the first acoustic wave 5a and the light wave 3 may interact in the interior of the propagation medium section 1. FIG. 7B shows how the second acoustic wave 5b and the light wave 3 may interact in the interior of the propagation medium section 1. In FIGS. 7A and 7B, Λ denotes the wavelength of the acoustic wave 5 propagating in the propagation medium section 1; f denotes the frequency of the acoustic wave 5; λ denotes the wavelength of the light wave 6; and $f_0$ denotes the frequency of the light wave 3. The light wave 3 propagates along the z axis direction, and the first acoustic wave 5a propagates along the x axis direction. The direction in which the first acoustic wave 5a propagates is defined as the positive direction on the x axis. Since the acoustic wave is a longitudinal wave, in the propagation medium section 1 shown in FIGS. 7A and 7B, blackened portions represent portions where the propagation medium is dense due to displacement of the propagation medium caused by the first acoustic wave 5a and second acoustic wave 5b, and white portions represent portions where the propagation medium is sparse.

As shown in FIG. 7A, as the first acoustic wave 5a propagates in the interior of the propagation medium section 1, the density of the propagation medium composing the propagation medium section 1 changes. Consequently, the refractive index of the propagation medium with respect to the light wave 3 attains changes according to the higher or lower density of the propagation medium. For example, when the first acoustic wave 5a propagates, which is a plane wave having the wavelength Λ, a refractive index variation pattern with a period of Λ occurs. In other words, the propagation medium section 1 becomes a diffraction grating having a refractive index variation pattern with the period Λ.

When the light wave 3 is allowed to enter the propagation medium section 1 in this state, a diffracted light wave is generated. In the case of any acoustic wave 5 whose sound pressure is in a measurable range, the diffracted light component of the $2^{nd}$ or any higher order would be small and therefore negligible.

As shown in FIG. 7A, when the light wave 3 enters the diffraction region 21 of the propagation medium section 1, three light waves will exit therefrom: the $0^{th}$ order diffracted light wave 3e, which intactly propagates along the z axis direction without being diffracted; the $+1^{st}$ order diffracted light wave 3a, which is diffracted in the positive direction on the x axis (i.e., the direction of propagation of the acoustic wave 5a) relative to the $0^{th}$ order diffracted light wave 3e; and the $-1^{st}$ order diffracted light wave 3b, which is diffracted in the negative direction on the x axis (i.e., opposite to the direction of propagation of the acoustic wave 5a) relative to the $0^{th}$ order diffracted light wave 3e.

The frequencies of the $+1^{st}$ order diffracted light wave 3a and $-1^{st}$ order diffracted light wave 3b are Doppler-shifted by the first acoustic wave 5a. When Doppler-shifted, the $+1^{st}$ order diffracted light wave 3a has a frequency of $f_0+f$, and the $-1^{st}$ order diffracted light wave 3b has a frequency of $f_0-f$. The frequency of the $0^{th}$ order diffracted light wave 3e remains at $f_0$.

Diffraction angles θ of the $+1^{st}$ order diffracted light wave 3a and $-1^{st}$ order diffracted light wave 3b, and the intensity $I_1$ of each diffracted light wave, are expressed by eqs. (1) and (2) below.

[eq. 1]
$$\sin\theta = \frac{\lambda}{\Lambda} = \frac{\lambda \cdot f}{V_n} \quad (1)$$

[eq. 2]
$$I_1 \propto J_1^2\left(\frac{2\pi\Delta nl}{\lambda}\right) \quad (2)$$

Herein, λ is the wavelength of the light wave 3; Λ is the wavelength of the first acoustic wave 5a; f is the frequency of the first acoustic wave 5a; Vn is the acoustic velocity (propagation rate) of the first acoustic wave 5a in the propagation medium section 1; Δn is an amount of refractive index change of the propagation medium section 1 caused by propagation of the first acoustic wave 5a; l is a distance traveled by the light wave 3 propagating in the propagation medium section 1; and $J_1$ is a Bessel function of the $1^{st}$ order. It can be seen from eq. (1) that the diffraction angle θ increases as the frequency of the acoustic wave 5 increases. Since the first acoustic wave 5a and second acoustic wave 5b have split from the acoustic wave 5, these wavelength Λ, frequency f, acoustic velocity Vn, and amount of refractive index change Δn are identical between the acoustic wave 5 and the second acoustic wave 5b.

FIG. 7B shows how the second acoustic wave 5b and the light wave 3 may interact in the interior of the propagation medium section 1. Similarly to FIG. 7A, Λ represents the wavelength of the acoustic wave 5 propagating in the propagation medium section 1; f represents the frequency of the acoustic wave 5; λ represents the wavelength of the light wave 3; and $f_0$ represents the frequency of the light wave 3. As in FIG. 7A, the light wave 3 propagates along the z axis direction. Unlike the acoustic wave 5a, the acoustic wave 5b propagates in the negative direction on the x axis.

With reference to FIG. 7B (as is the case with the first acoustic wave 5a), as the second acoustic wave 5b propagates in the interior of the propagation medium section 1, the density of the propagation medium composing the propagation medium section 1 changes, whereby the propagation medium section 1 becomes a diffraction grating having a refractive index variation pattern with a period of Λ. As shown in FIG. 7B, when the light wave 3 enters the diffraction region 21 of the propagation medium section 1, the following occurs: the $0^{th}$ order diffracted light wave 3e, which intactly propagates along the z axis direction without being diffracted; the $+1^{st}$ order diffracted light wave 3c, which is diffracted in the negative direction on the x axis (i.e., the direction of propagation of the acoustic wave 5b) relative to the $0^{th}$ order diffracted light wave 3e; and the $-1^{st}$ order diffracted light wave 3d, which is diffracted in the positive direction on the x axis (i.e., opposite to the direction of propagation of the acoustic wave 5b) relative to the $0^{th}$ order diffracted light wave 3e. The frequency of the $+1^{st}$ order diffracted light wave 3c and $-1^{st}$ order diffracted light wave 3d are Doppler-shifted by the second acoustic wave 5b. When Doppler-shifted, the $-1^{st}$ order diffracted light wave 3c has a frequency of $f_0+f$, and the $-1^{st}$ order diffracted light wave 3d has a frequency of $f_0-f$. The frequency of the 0th order diffracted light wave 3e remains at $f_0$. Diffraction angles θ of the $+1^{st}$ order diffracted light wave 3c and $-1^{st}$ order diffracted light wave 3d and the intensity $I_1$ of each diffracted light wave, are expressed by eqs. (1) and (2) above.

Although FIGS. 7A and 7B separately illustrate the interactions between the light wave 3 and the first acoustic wave 5a and second acoustic wave 5b, in the optical microphone 100, the first acoustic wave 5a and second acoustic wave 5b simultaneously arrive at the diffraction region 21 of the propagation medium section 1. Therefore, as shown in FIG. 2B, the first acoustic wave 5a and second acoustic wave 5b propagating in opposite directions concurrently act on the light wave 3, so that the $+1^{st}$ order diffracted light wave 3a and $-1^{st}$ order diffracted light wave 3b ascribable to the first acoustic wave and the $+1^{st}$ order diffracted light wave 3c and $-1^{st}$ order diffracted light wave 3d ascribable to the second acoustic wave 5b are concurrently generated.

Figure 8A:
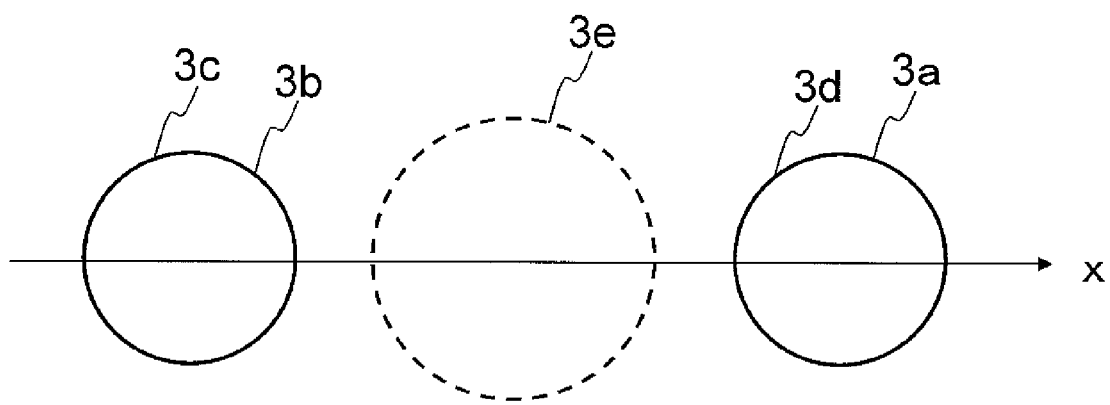
FIGS. 8A and 8B are diagrams, as viewed along the optical axis of a light wave emitted from a light source, showing the positions of a $0^{th}$ order diffracted light wave and $\pm 1^{st}$ order diffracted light waves of the light wave.
Figure 8B:
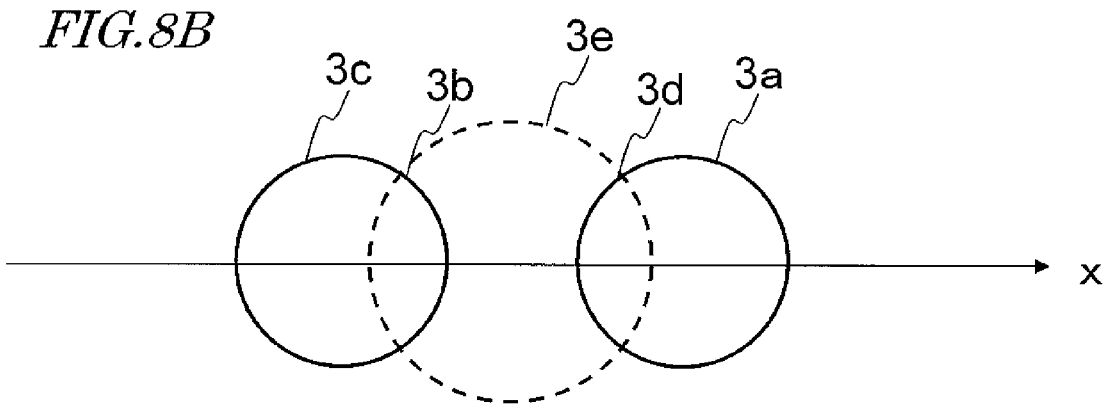

FIGS. 8A and 8B show a diffracted light wave after being transmitted through the propagation medium section 1. FIGS. 8A and 8B show the diffracted light wave as viewed from the direction in which the light wave 3 propagates. When the acoustic waves 5a and 5b interacting with the light wave 3 propagate in opposite directions and have an equal frequency, the parameters on the right-hand side of eq. (1) above will be identical between the two, thus resulting in an identical diffraction angle θ. Therefore, the $+1^{st}$ order diffracted light wave 3a diffracted by the first acoustic wave 5a and the $-1^{st}$ order diffracted light wave 3d diffracted by the second acoustic wave 5b are diffracted at the same angle in the same direction with an identical optical path, and so are the $-1^{st}$ order diffracted light wave 3b diffracted by the acoustic wave 5a and the $+1^{st}$ order diffracted light wave 3c diffracted by the acoustic wave 5b.

As a result, the $+1^{st}$ order diffracted light wave 3a ascribable to the first-acoustic wave 5a and the $-1^{st}$ order diffracted light wave 3d ascribable to the second acoustic wave 5b overlap and interfere with each other, and so do the $-1^{st}$ order diffracted light wave 3b ascribable to the first acoustic wave 5a and the $+1^{st}$ order diffracted light wave 3c ascribable to the second acoustic wave 5b, as shown in FIGS. 8A and 8B. That is, since the $+1^{st}$ order diffracted light wave 3a has a frequency of $f_0+f$ and the $-1^{st}$ order diffracted light wave 3d has a frequency of $f_0-f$, a interference component whose intensity changes with a frequency of 2f is obtained. Similarly, since the $-1^{st}$ order diffracted light wave 3b has a frequency of $f_0-f$ and the $+1^{st}$ order diffracted light wave 3c has a frequency of $f_0+f$, a interference component whose intensity changes with a frequency of $2f$ is obtained. Consequently, when the $+1^{st}$ order diffracted light wave $3a$ and $-1^{st}$ order diffracted light wave $3d$, or the $-1^{st}$ order diffracted light wave $3b$ and $+1^{st}$ order diffracted light wave $3c$, are detected by the photoelectric conversion section 4, a differential frequency light component with a frequency of $2f$ will be found contained.

Even when the acoustic wave 5 has a changing frequency, so long as the frequencies of the first acoustic wave $5a$ and second acoustic wave $5b$ are the same, the diffraction angle $\theta$ will change in an identical manner for both the first acoustic wave $5a$ and the second acoustic wave $5b$, and thus the area of overlap between the $+1^{st}$ order diffracted light wave $3a$ and the $-1^{st}$ order diffracted light wave $3d$, and the area of overlap between the $-1^{st}$ order diffracted light wave $3b$ and the $+1^{st}$ order diffracted light wave $3c$, will not change. Therefore, the detection sensitivity will not vary depending on the frequency of the acoustic wave 5.

However, as shown in FIG. 8A, depending on the magnitude of the diffraction angle $\theta$ and the position of the photoelectric conversion section 4, there may be a situation where the $0^{th}$ order diffracted light wave $3e$ has no overlap with the $+1^{st}$ order diffracted light wave $3a$ and $-1^{st}$ order diffracted light wave $3d$, or with the $-1^{st}$ order diffracted light wave $3b$ and $+1^{st}$ order diffracted light wave $3c$. As shown in FIG. 8B, depending on the position of the photoelectric conversion section 4, there may also be a situation where the $0^{th}$ order diffracted light wave $3e$ has a partial overlap with the $+1^{st}$ order diffracted light wave $3a$ and $-1^{st}$ order diffracted light wave $3d$ and with the $-1^{st}$ order diffracted light wave $3b$ and $+1^{st}$ order diffracted light wave $3c$.

Figure 9A:
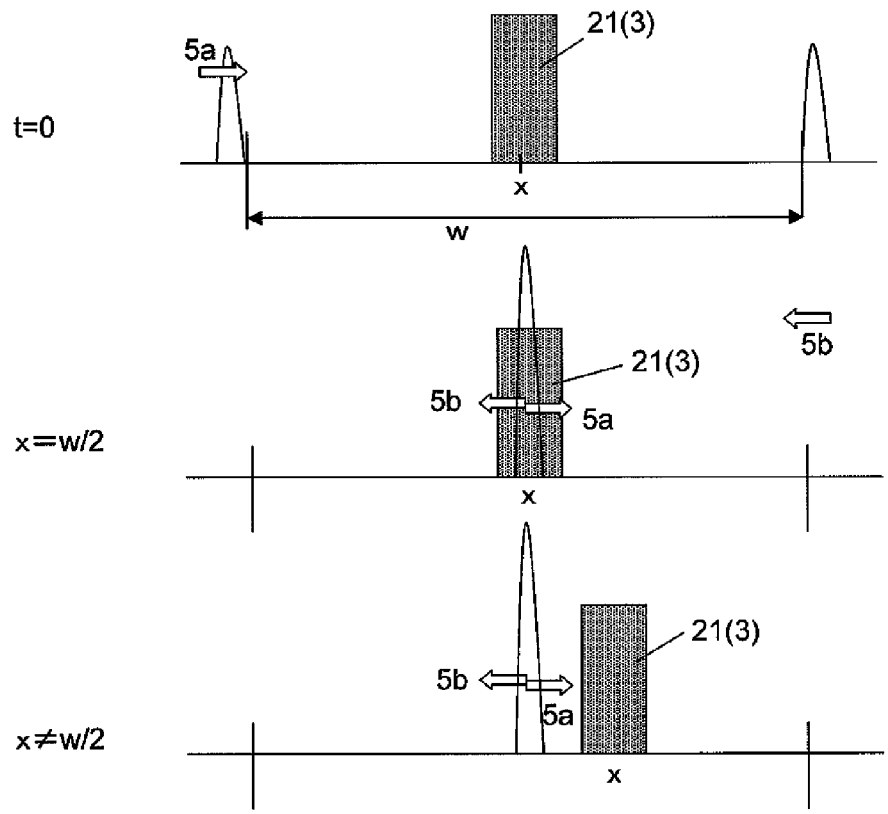
FIGS. 9A and 9B are schematic diagrams for explaining propagation of first and second acoustic waves.
Figure 9B:
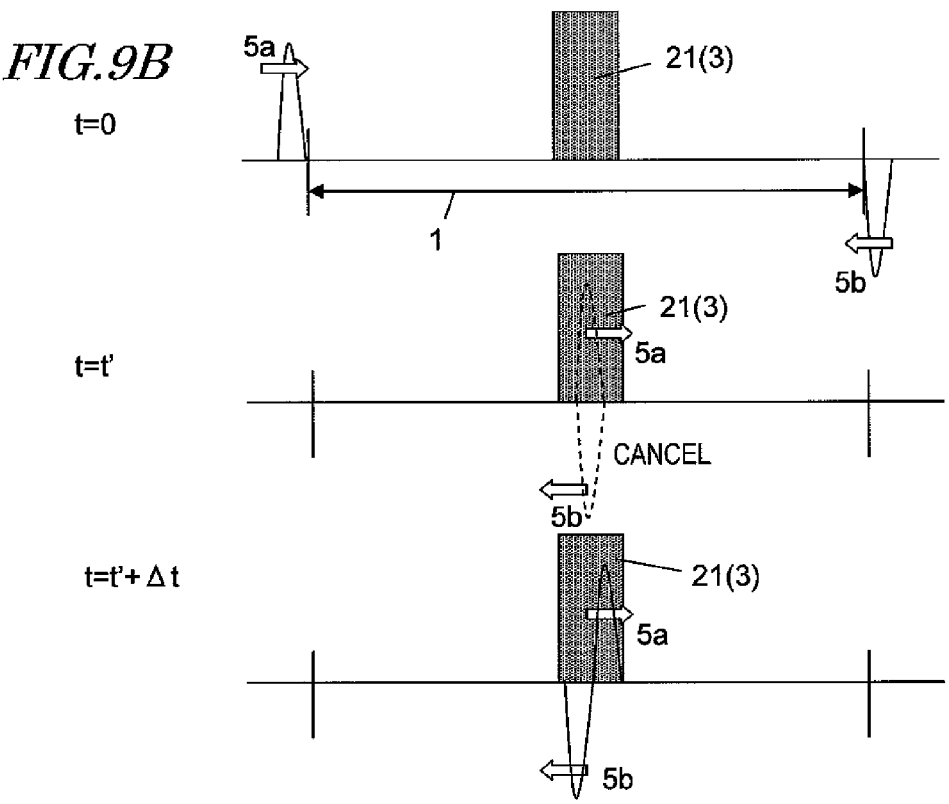

Diffraction of the light wave 3 in the diffraction region 21 will be further discussed. FIGS. 9A and 9B are diagrams for explaining changes in the refractive index of the propagation medium section 1 that are ascribable to the first acoustic wave $5a$ and second acoustic wave $5b$, where the first acoustic wave $5a$ and second acoustic wave $5b$ are illustrated as transverse waves. As shown in FIG. 9A, when $t=0$, the first and second acoustic waves $5a$ and $5b$ which enter at the first and second input aperture planes $6a$ and $6b$ being apart by a distance $w$ propagate in opposite directions, until they overlap at a distance of $w/2$ according to the principle of superposition of waves. This would appear as if an acoustic wave with a doubled amplitude emerges at the distance of $w/2$, after which the first acoustic wave $5a$ and second acoustic wave $5b$ propagate in a manner of moving away from each other due to independence of waves.

What the wave with a doubled amplitude shown in FIG. 9A signifies is that, in the propagation of an actual longitudinal wave, the amount of change in the refractive index of the propagation medium will be doubled, and since eq. (2) dictates that the amount of change in the refractive index of a propagation medium is in proportion to the intensity of a diffracted light wave, diffracted light with a strong intensity will occur. This means that the light consisting of the overlapping $+1^{st}$ order diffracted light wave $3a$ and $-1^{st}$ order diffracted light wave $3d$, or the light consisting of the overlapping $-1^{st}$ order diffracted light wave $3b$ and $+1^{st}$ order diffracted light wave $3c$, contains a component having an intensity which is twice that of the $+1^{st}$ order diffracted light wave $3a$ and having a frequency of $2f$.

In the case where the first acoustic wave $5a$ and second acoustic wave $5b$ are continuous waves with a constant frequency, and have the same amplitude, a standing wave will occur in the propagation medium section 1. While changing its amplitude with a constant frequency, this standing wave will appear not to propagate, because the position where the wave emerges will not change. However, the temporal change in the amplitude of the standing wave is a result of superposition of the propagating first acoustic wave $5a$ and second acoustic wave $5b$. Therefore, this case can also be considered to be situation where the frequencies of the $+1^{st}$ order diffracted light waves $3a$, $3b$, $3c$, and $3d$ are shifted due to an Doppler effect caused by the propagation of the first acoustic wave $5a$ and second acoustic wave $5b$ in the propagation medium section 1.

In the case where the diffraction region 21 is not positioned at a distance of $w/2$, as shown at the bottom of FIG. 9A, diffracted light ascribable to the first acoustic wave $5a$ occurs first, followed by diffracted light ascribable to the second acoustic wave $5b$. In this case, the $+1^{st}$ order diffracted light wave $3a$ and the $-1^{st}$ order diffracted light wave $3d$ are occurring at the same position (i.e., same diffraction angle $\theta$), but at different points in time. Therefore, the aforementioned interference between the $+1^{st}$ order diffracted light wave $3a$ and the $-1^{st}$ order diffracted light wave $3d$ does not occur. In other words, no interference component is detected.

FIG. 9B illustrates a case where the first acoustic wave $5a$ and second acoustic wave $5b$ have differing phases (shown as being inverted in the figure). At $t=t'$, if the first acoustic wave $5a$ and second acoustic wave $5b$ with mutually inverted phases arrive at a position $x=w/2$ in the diffraction region 21, since the phases of the two acoustic waves are inverted, the two acoustic wave cancel each other at the time point of arrival of the first acoustic wave $5a$ and second acoustic wave $5b$, so that no waveform is observed. However, before and after this point in time, i.e., $t=t'+\Delta t$ or $t=t'+\Delta t$, the first acoustic wave $5a$ and the second acoustic wave 5 separately exist due to independence of waves, so that diffraction due to the first acoustic wave $5a$ and second acoustic wave $5b$ occurs in the manner described above. In this case, the phase of intensity changes of the interference component varies depending on the phase difference between the first acoustic wave $5a$ and second acoustic wave $5b$.

Portions (a), (b), and (c) of FIG. 10 schematically show signal detection of the acoustic wave 5 in the optical microphone 100.

When interference light of the $+1^{st}$ order diffracted light wave $3a$ and $-1^{st}$ order diffracted light wave $3d$, or that of the $-1^{st}$ order diffracted light wave $3b$ and $+1^{st}$ order diffracted light wave $3c$, is received and subjected to photoelectric conversion by the photoelectric conversion section 4, an electrical signal is obtained as shown in FIG. 10($a$), in which a signal with a frequency of $2f$ is added to a DC component that is in accordance with the intensity of the diffracted light wave. The acoustic wave 5 can be detected by removing this DC component therefrom. The resultant electrical signal is a signal corresponding to the input acoustic wave 5, except that its frequency is twice that of the input acoustic wave. In order to detect the acoustic wave 5 with the same frequency as when input, the resultant electrical signal may be input to the frequency converter 22 as shown in FIG. 1 for a process of reducing the frequency by $\frac{1}{2}$.

As described above, depending on the diffraction angle $\theta$ and the position of the photoelectric conversion section 4, there may be a situation where the $\pm 1^{st}$ order diffracted light waves $3a$, $3b$, $3c$, and $3d$ do not overlap but are separate from the $0^{th}$ order diffracted light wave $3e$ (FIG. 8A), or a situation where the $\pm 1^{st}$ order diffracted light waves $3a$, $3b$, $3c$, and $3d$ overlap a portion of the $0^{th}$ order diffracted light wave $3e$ (FIG. 8B).

As shown in FIG. 2A, assuming that the propagation medium section 1 and the photoelectric conversion section 4 are at a distance L, the light wave 3 has a beam width $w$, and the diffraction angle is θ, the ±1$^{st}$ order diffracted light waves 3a, 3b, 3c, and 3d do not overlap but are separate from the 0$^{th}$ order diffracted light wave 3e when eq. (3) below is satisfied, as shown in FIG. 8A. On the other hand, when eq. (4) is satisfied, the ±1$^{st}$ order diffracted light waves 3a, 3b, 3c, and 3d overlap a portion of the 0$^{th}$ order diffracted light wave 3e, as shown in FIG. 8B.

[eq. 3]

$$\theta \times L > w \quad (3)$$

[eq. 4]

$$\theta \times L < w \quad (4)$$

First, the situation where the ±1$^{st}$ order diffracted light waves 3a, 3b, 3c, and 3d are separate from the 0$^{th}$ order diffracted light wave 3e as shown in FIG. 8A will be discussed. According to the principles of the optical microphone 100 of the present embodiment, the 0$^{th}$ order diffracted light wave 3e does not contribute to detection of the acoustic wave 5, and therefore need not be received by the photoelectric conversion section 4. When they are separate as shown in FIG. 8A, by disposing the photoelectric conversion section 4 at a position which is shifted along the x axis direction so as to prevent the 0th order diffracted light wave 3e from being received, it will be ensured that only the +1$^{st}$ order diffracted light wave 3a ascribable to the first acoustic wave 5a and the −1$^{st}$ order diffracted light wave 3d ascribable to the second acoustic wave 5b, or only the −1$^{st}$ order diffracted light wave 3b ascribable to the first acoustic wave 5a and the +1$^{st}$ order diffracted light wave 3c ascribable to the second acoustic wave 5b, are received.

FIG. 10(a) illustrates signal detection of the acoustic wave 5 in the case of not receiving the 0$^{th}$ order diffracted light wave 3e. On the other hand, when the 0th order diffracted light wave 3e is received by the photoelectric conversion section 4, the DC component in the intensity of the received light will increase as shown in FIG. 10(b). In this case, too, if the intensity of received light at the photoelectric conversion section 4 is smaller than the maximum input level of the photoelectric conversion section 4, the acoustic wave 5 can still be detected. However, the portion of the light wave received by the photoelectric conversion section 4 that contributes to the detection of the acoustic wave 5 will become relatively small. Therefore, for higher measurement accuracy, it is preferable that the 0$^{th}$ order diffracted light wave 3e be not received.

In the case where the intensity of received light at the photoelectric conversion section 4 is greater than the maximum input level of the photoelectric conversion section 4, the output of the photoelectric conversion section 4 will be saturated as shown in FIG. 10(c), so that the acoustic wave 5 cannot be detected. From the above, it is preferable that the 0$^{th}$ order diffracted light wave 3e be not received in the case where the diffracted light wave is separated as shown in FIG. 8A.

Moreover, as shown in FIG. 11, only the 0$^{th}$ order diffracted light wave 3e may be blocked by a buffer 7 or the like, while receiving all of the ±1$^{st}$ order diffracted light waves 3a, 3b, 3c, and 3d, whereby the intensity of the light wave contributing to signal detection of the acoustic wave 5 is doubled as compared to the case where the interference light component of only either the +1$^{st}$ order diffracted light wave 3a and −1$^{st}$ order diffracted light wave 3d or the −1$^{st}$ order diffracted light wave 3b and +1$^{st}$ order diffracted light wave 3a is received. As a result, in the photoelectric conversion section 4, without increasing the component that does not contribute to the detection of the acoustic wave 5, photoelectric conversion can be conducted with a large intensity of received light, thereby enabling signal detection with a higher sensitivity.

Next, as shown in FIG. 8B, a case where the ±1$^{st}$ order diffracted light waves 3a, 3b, 3c, and 3d overlap portions of the 0$^{th}$ order diffracted light wave 3e will be discussed.

When there are partial overlaps as shown in FIG. 8B, interference occurs not only in the overlaps between the +1$^{st}$ order diffracted light wave 3a and the −1$^{st}$ order diffracted light wave 3d and between the −1$^{st}$ order diffracted light wave 3b and the +1$^{st}$ order diffracted light wave 3c, but also in the overlaps between the 0$^{th}$ order diffracted light wave 3e and the ±1$^{st}$ order diffracted light waves 3a, 3b, 3c, and 3d. When the 0$^{th}$ order diffracted light wave 3e interferes with the ±1$^{st}$ order diffracted light waves 3a, 3b, 3c, and 3d, differential frequency light components with a frequency of f occur. In this case, the differential frequency light component between the 0$^{th}$ order diffracted light wave 3e and the +1$^{st}$ order diffracted light wave 3a or 3c and the differential frequency light component between the 0$^{th}$ order diffracted light wave 3e and the −1$^{st}$ order diffracted light wave 3b or 3d have opposite phases. Therefore, after the photoelectric conversion, these differential frequency light components cancel each other, so that no electrical signal with a frequency of f is obtained. Thus, even in a situation where the 0$^{th}$ order diffracted light wave 3e is inseparable from the ±1$^{st}$ order diffracted light waves 3a, 3b, 3c, and 3d, only a signal with a frequency of 2f is obtained.

However, as in the case of FIG. 8A, receiving the 0$^{th}$ order diffracted light wave 3e will increase the DC component of the light wave that does not contribute to detection of the acoustic wave 5. Moreover, if the intensity of received light exceeds the maximum input light intensity of the photoelectric conversion section 4, the acoustic wave 5 will no longer be detectable. Therefore, in order to avoid receiving the 0$^{th}$ order diffracted light wave 3e, it is preferable to dispose the photoelectric conversion section 4 so as to be shifted along the x axis direction, or block a portion of the 0$^{th}$ order diffracted light wave 3e, thus reducing the non-modulated light component. However, when there are partial overlaps as shown in FIG. 8B, in the portions where the 0$^{th}$ order diffracted light wave 3e overlaps with the interference light of the +1$^{st}$ order diffracted light wave 3a and −1$^{st}$ order diffracted light wave 3d or with the interference light of the −1$^{st}$ order diffracted light wave 3b and +1$^{st}$ order diffracted light wave 3c, it is impossible to separate the interference light from the 0$^{th}$ order diffracted light wave 3e. Therefore, a choice may be made between tolerating the reception of the 0$^{th}$ order diffracted light wave 3e in such overlaps, or precluding light reception in such overlaps altogether.

When choosing to allow reception of the 0$^{th}$ order diffracted light wave 3e, the proportion which the intensity of light contributing to the detection of the acoustic wave 5 accounts for in the intensity of received light will decrease, thus resulting in poorer measurement accuracy. When choosing not to receive any light in the overlaps at all, the intensity of received light will be lowered, thus resulting in poorer sensitivity. Therefore, for the sake of separating the 0$^{th}$ order diffracted light wave 3e, it is preferable that the ±1$^{st}$ order diffracted light waves 3a, 3b, 3c, and 3d are separate from the 0$^{th}$ order diffracted light wave 3e as shown in FIG. 8A.

Note that use of a dry silica gel as the propagation medium section 1 lowers the acoustic velocity Vn of the acoustic wave 5 propagating in the interior of the propagation medium, whereby a large diffraction angle can be obtained as indicated by eq. (1). This makes it possible, when ensuring separation of the 0$^{th}$ order diffracted light wave 3e from the ±1$^{st}$ order diffracted light 3a, 3b, 3c, and 3d, to reduce the distance L from the propagation medium section 1 to the photoelectric conversion section 4.

Moreover, as shown in FIG. 12, an optical element 8 such as a lens may be interposed between the propagation medium section 1 and the photoelectric conversion section 4 so as to alter the directions of propagation of at least the $+1^{st}$ order diffracted light waves 3a and 3c and the $-1^{st}$ order diffracted light waves 3b and 3d. This makes it possible, when ensuring separation of the $0^{th}$ order diffracted light wave 3e from the $\pm1^{st}$ order diffracted light waves 3a, 3b, 3c, and 3d, to further reduce the distance from the propagation medium section 1 to the photoelectric conversion section 4.

In the above-described embodiments, the propagation medium section 1 is composed of a single member, and the first acoustic wave 5a and second acoustic wave 5b propagate through the same terrain in the diffraction region 21. Alternatively, the first acoustic wave 5a and second acoustic wave 5b may be transmitted through different terrains in the diffraction region 21.

FIG. 13 shows an optical microphone having a first propagation medium portion 1a and a second propagation medium portion 1b.

The first propagation medium portion 1a and the second propagation medium portion 1b are disposed between the light source 2 and the photoelectric conversion section 4, one being overlaid on the other, such that a light wave 3 transmitted through a diffraction region (first diffraction subregion) 21a of the first propagation medium portion 1a is transmitted through a diffraction region (second diffraction subregion) 21b of the second propagation medium portion 1b. The first propagation medium portion 1a and the second propagation medium portion 1b are composed of the same propagation medium, such that any acoustic wave 5 propagating in their interior experiences an identical acoustic velocity Vn. Therefore, $+1^{st}$ order diffracted light wave 3a ascribable to a first acoustic wave 5a and a $-1^{st}$ order diffracted light wave 3d ascribable to a second acoustic wave 5b are diffracted at the same angle in the same direction, and so are a $-1^{st}$ order diffracted light wave 3b ascribable to the first acoustic wave 5a and a $+1^{st}$ order diffracted light wave 3c ascribable to the second acoustic wave 5b. Therefore, the $+1^{st}$ order diffracted light wave 3a and the $-1^{st}$ order diffracted light wave 3d are parallel to each other, and the $-1^{st}$ order diffracted light wave 3b and the $+1^{st}$ order diffracted light wave 3c are parallel to each other.

As a result, as shown in FIG. 14, the $+1^{st}$ order diffracted light wave 3a ascribable to the first acoustic wave 5a and the $-1^{st}$ order diffracted light wave 3d ascribable to the second acoustic wave 5b overlap in a large part thereof, although the optical axes of the diffracted light waves are slightly deviated, thus undergoing interference in the overlapping portion; and the same is also true of the $-1^{st}$ order diffracted light wave 3b ascribable to the first acoustic wave 5a and the $+1^{st}$ order diffracted light wave 3c ascribable to the second acoustic wave 5b. Even when the acoustic wave 5 has a changing frequency, so long as the first propagation medium portion 1a and the second propagation medium portion 1b have the same acoustic velocity and the acoustic waves 5a and 5b have the same frequency, the diffraction angle will change in an identical manner for both the acoustic wave 5a and the acoustic wave 5b, such that their relative positioning will be maintained. Therefore, the interference portions will not change in area, so that the detection sensitivity will not vary depending on the frequency of the acoustic wave 5.

Thus, with the optical microphone of the present embodiment, a first acoustic wave, which is a portion of an acoustic wave to be detected, and a second acoustic wave, which is another portion of the acoustic wave, are propagated in antiparallel directions in a propagation medium section, such that the first and second acoustic waves simultaneously traverse a light wave which is transmitted through the propagation medium section. Therefore, a $+1^{st}$ order diffracted light wave ascribable to the first acoustic wave and a $-1^{st}$ order diffracted light wave ascribable to the second acoustic wave, or a $-1^{st}$ order diffracted light wave ascribable to the first acoustic wave and a $+1^{st}$ order diffracted light wave ascribable to the second acoustic wave, are diffracted at the same diffraction angle, irrespective of the acoustic wave frequency. Therefore, there are constant interference components between the $+1^{st}$ order diffracted light waves and the $-1^{st}$ order diffracted light waves irrespective of the acoustic wave frequency, whereby an optical microphone that is capable of acoustic wave detection with a constant detection sensitivity irrespective of the acoustic wave frequency can be realized.

Moreover, since an acoustic wave for detection is detected as an interference component(s) between the $+1^{st}$ order diffracted light wave and the $-1^{st}$ order diffracted light wave, the acoustic wave to be detected is manifested as changes in the light amount of the interference component(s). Therefore, without employing a bulky optical system laser such as a Doppler vibrometer, the interference component can be detected by using a simple photoelectric conversion element. Thus, the construction of the optical microphone can be kept small and simple.

An optical microphone disclosed in the present application is useful as a small-sized ultrasonic sensor or the like, or an audible-range microphone or the like. It is also applicable to an ultrasonic receiver sensor or the like to be used in an ambient environment system utilizing ultrasonic waves.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical microphone for detecting an acoustic wave by using a light wave, the acoustic wave propagating in an ambient fluid, comprising:
   a propagation medium section for the acoustic wave to propagate through;
   a light source for emitting a light wave to be transmitted through a diffraction region in the propagation medium section; and
   a photoelectric conversion section for detecting the light wave having been transmitted through the propagation medium section and outputting an electrical signal, wherein,
   the optical microphone is configured:
   to allow a first acoustic wave and a second acoustic wave to propagate in antiparallel directions in the propagation medium section so as to simultaneously arrive at the diffraction region and traverse the light wave being transmitted through the diffraction region, the first acoustic wave being a portion of the acoustic wave and the second acoustic wave being at least a portion of the remainder; and
   to generate, in the diffraction region, a $+1^{st}$ order diffracted light wave and a $-1^{st}$ order diffracted light wave of the light wave based on a refractive index distribution of a propagation medium composing the propagation medium section, the refractive index distribution occurring due to propagation of the first acoustic wave and the second acoustic wave; and the photoelectric conversion section detects at least one of:
an interference component between a $+1^{st}$ order diffracted light wave of the light wave ascribable to the first acoustic wave and a $-1^{st}$ order diffracted light wave of the light wave ascribable to the second acoustic wave; and another interference component between a $-1^{st}$ order diffracted light wave of the light wave ascribable to the first acoustic wave and a $+1^{st}$ order diffracted light wave of the light wave ascribable to the second acoustic wave.

2. The optical microphone of claim 1, wherein the propagation medium section includes first and second input aperture planes opposite from each other, the first acoustic wave and the second acoustic wave being respectively incident to the first and second input aperture planes.

3. The optical microphone of claim 2, wherein the first and second input aperture planes of the propagation medium section are positioned equidistant from the diffraction region.

4. The optical microphone of claim 3, further comprising a waveguide structure having:
first and second input apertures facing in a same direction;
first and second output apertures opposing each other; and
first and second waveguides provided respectively between the first and second input apertures and the first and second output apertures, the waveguide structure guiding the first acoustic wave entering at the first input aperture and the second acoustic wave entering at the second input aperture respectively to the first and second output apertures, wherein
the first and second output apertures of the waveguide structure are disposed on the first and second input aperture planes of the propagation medium section, respectively.

5. The optical microphone of claim 4, wherein the first and second waveguides are disposed symmetrically in the waveguide structure.

6. The optical microphone of claim 4, further comprising a horn connected to the first and second input apertures of the waveguide structure.

7. The optical microphone of claim 1, wherein the first acoustic wave and the second acoustic wave are transmitted through a same terrain in the diffraction region.

8. The optical microphone of claim 1, wherein the first acoustic wave and the second acoustic wave are transmitted through different terrains in the diffraction region.

9. The optical microphone of claim 8, wherein,
the propagation medium section includes a first propagation medium portion and a second propagation medium portion;
the diffraction region includes a first diffraction subregion and a second diffraction subregion respectively positioned in the first propagation medium portion and the second propagation medium portion; and
between the light source and the photoelectric conversion section, the first diffraction subregion and the second diffraction subregion are together disposed so that one is overlaid on the other.

10. The optical microphone of claim 1, wherein,
the photoelectric conversion section is disposed so as to be shifted, along a direction along which the first acoustic wave and the second acoustic wave propagate, from the light wave having been transmitted through the diffraction region, and detects only one of: the interference component between the $+1^{st}$ order diffracted light wave of the light wave ascribable to the first acoustic wave and the $-1^{st}$ order diffracted light wave of the light wave ascribable to the second acoustic wave; and the other interference component between the $-1^{st}$ order diffracted light wave of the light wave ascribable to the first acoustic wave and the $+1^{st}$ order diffracted light wave of the light wave ascribable to the second acoustic wave.

11. The optical microphone of claim 1, further comprising, between the photoelectric conversion section and the diffraction region in the propagation medium section, a blocking section for blocking the light wave having been transmitted through the diffraction region so that a part or a whole of the light wave having been transmitted through the diffraction region is prevented from entering the photoelectric conversion section.

12. The optical microphone of claim 1, further comprising, between the propagation medium and the photoelectric conversion section, an optical element for changing directions of propagation of the $+1^{st}$ order diffracted light wave and the $-1^{st}$ order diffracted light wave of the light wave.

13. The optical microphone of claim 1, wherein the propagation medium section has an acoustic velocity smaller than that of air, and is composed of a propagation medium in solid form.

14. The optical microphone of claim 13, wherein the propagation medium is composed of a dry silica gel.

15. The optical microphone of claim 1, further comprising a frequency conversion section for converting a frequency of the electrical signal obtained at the photoelectric conversion section into ½.

16. A method of detecting an acoustic wave propagating in an ambient fluid by using a light wave, the method comprising:
a step of allowing a first acoustic wave and a second acoustic wave to propagate in antiparallel directions in the propagation medium section so as to simultaneously arrive at a diffraction region of the propagation medium section, the first acoustic wave being a portion of the acoustic wave and the second acoustic wave being at least a portion of the remainder;
a step of allowing a light wave to be transmitted through the diffraction region of the propagation medium section so as to traverse the propagating first acoustic wave and second acoustic wave, and generating a $+1^{st}$ order diffracted light wave and a $-1^{st}$ order diffracted light wave of the light wave in the diffraction region based on a refractive index distribution of a propagation medium composing the propagation medium section, the refractive index distribution occurring due to propagation of the first acoustic wave and the second acoustic wave; and
a step of detecting at least one of: an interference component between a $+1^{st}$ order diffracted light wave of the light wave ascribable to the first acoustic wave and a $-1^{st}$ order diffracted light wave of the light wave ascribable to the second acoustic wave; and another interference component between a $-1^{st}$ order diffracted light wave of the light wave ascribable to the first acoustic wave and a $+1^{st}$ order diffracted light wave of the light wave ascribable to the second acoustic wave.

* * * * *